Sept. 17, 1963 P. H. ALLEN ETAL 3,104,316
REGISTERS
Filed Aug. 20, 1945 15 Sheets-Sheet 10
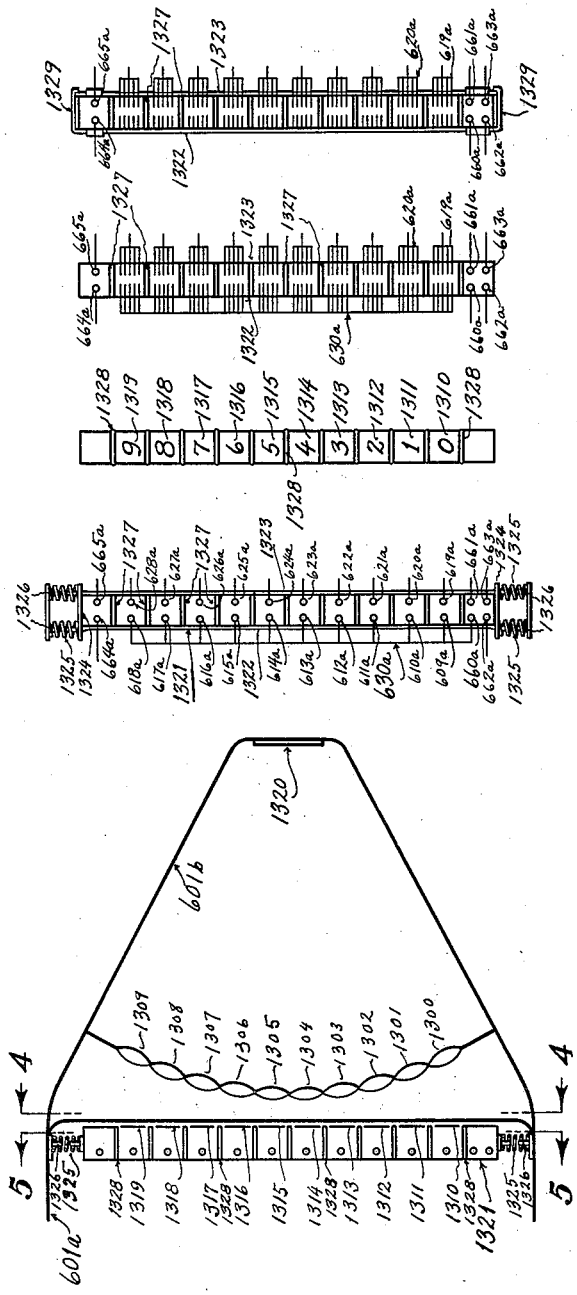
INVENTORS.
Philip H. Allen.
Benjamin J. Chung

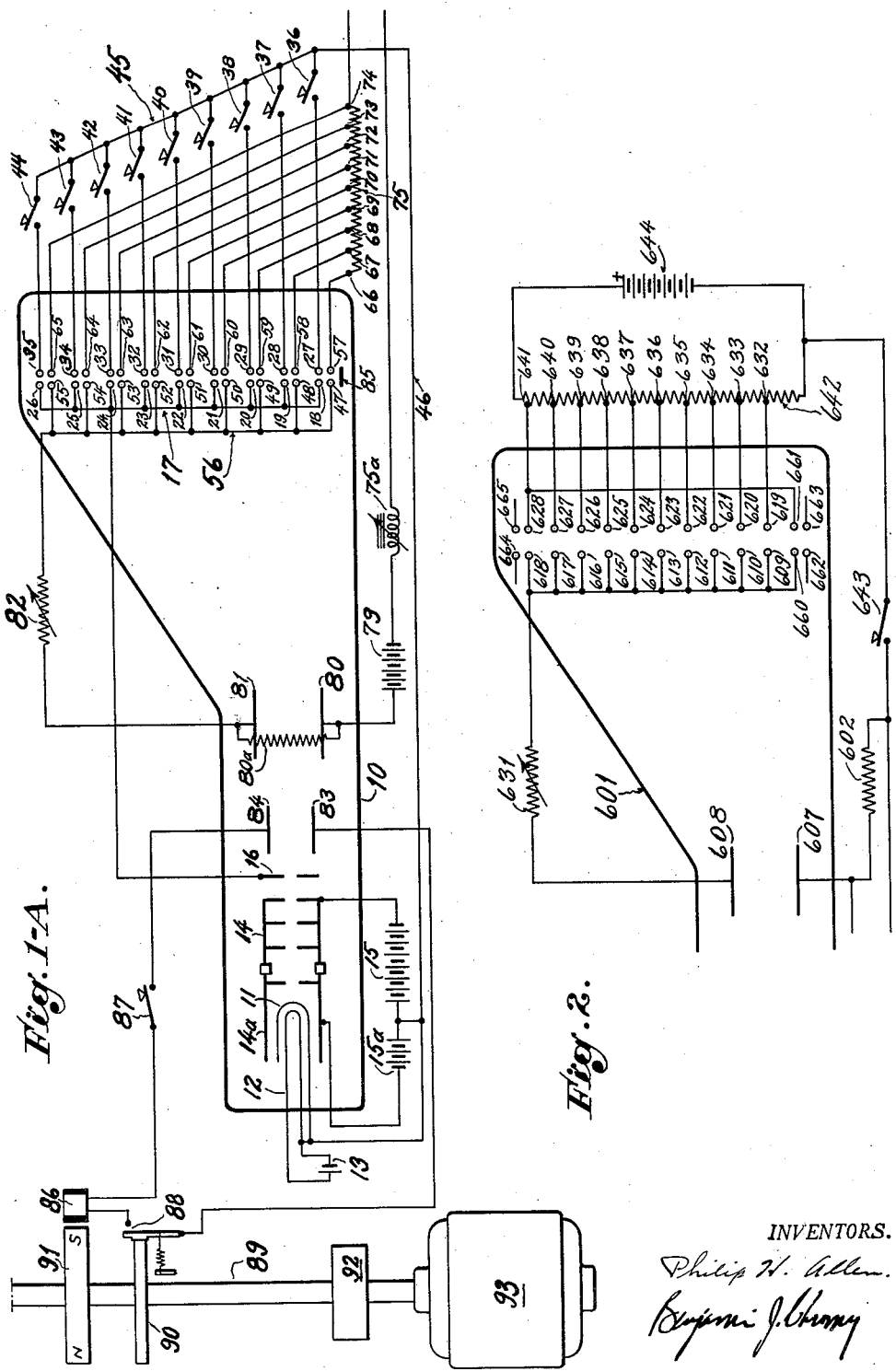

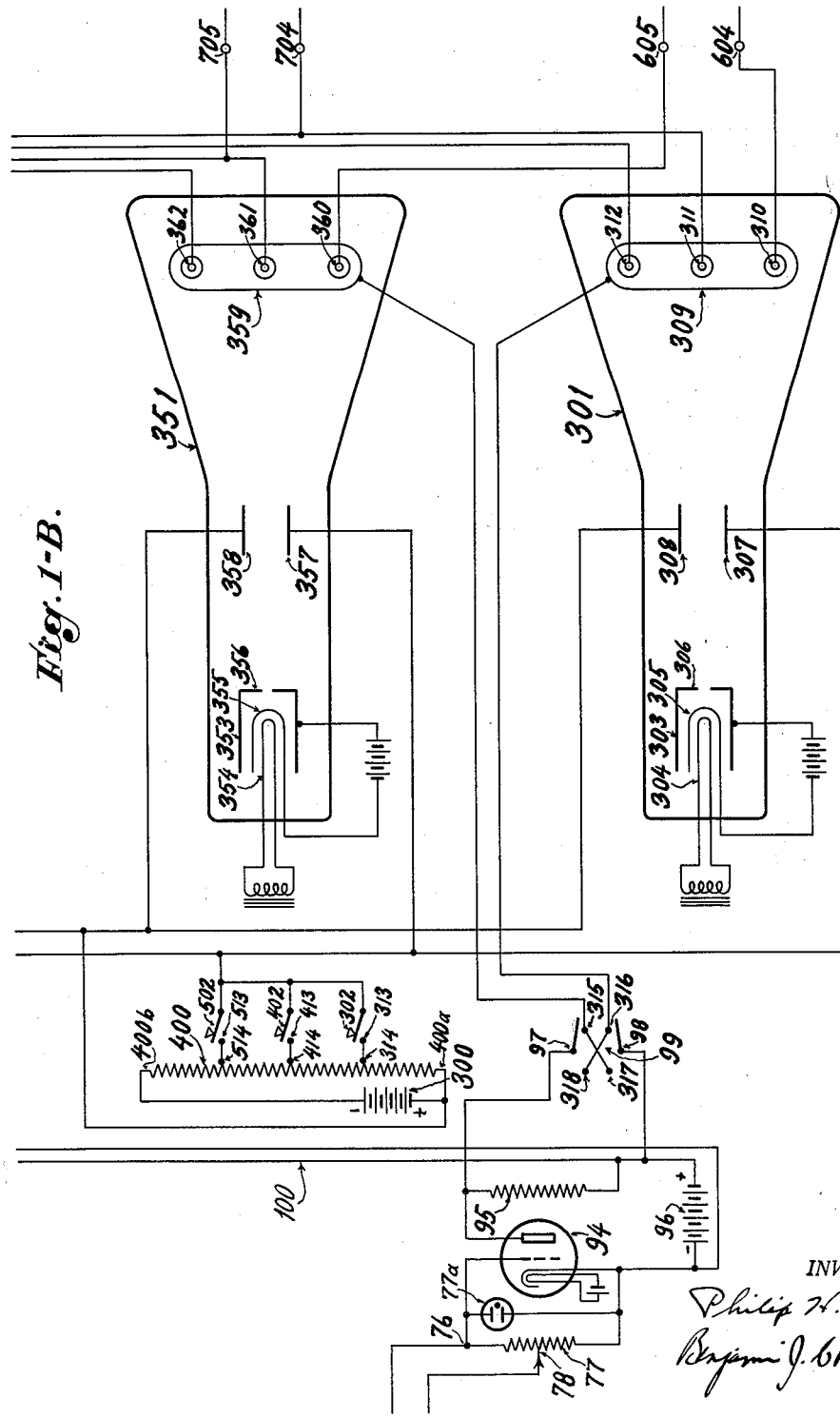

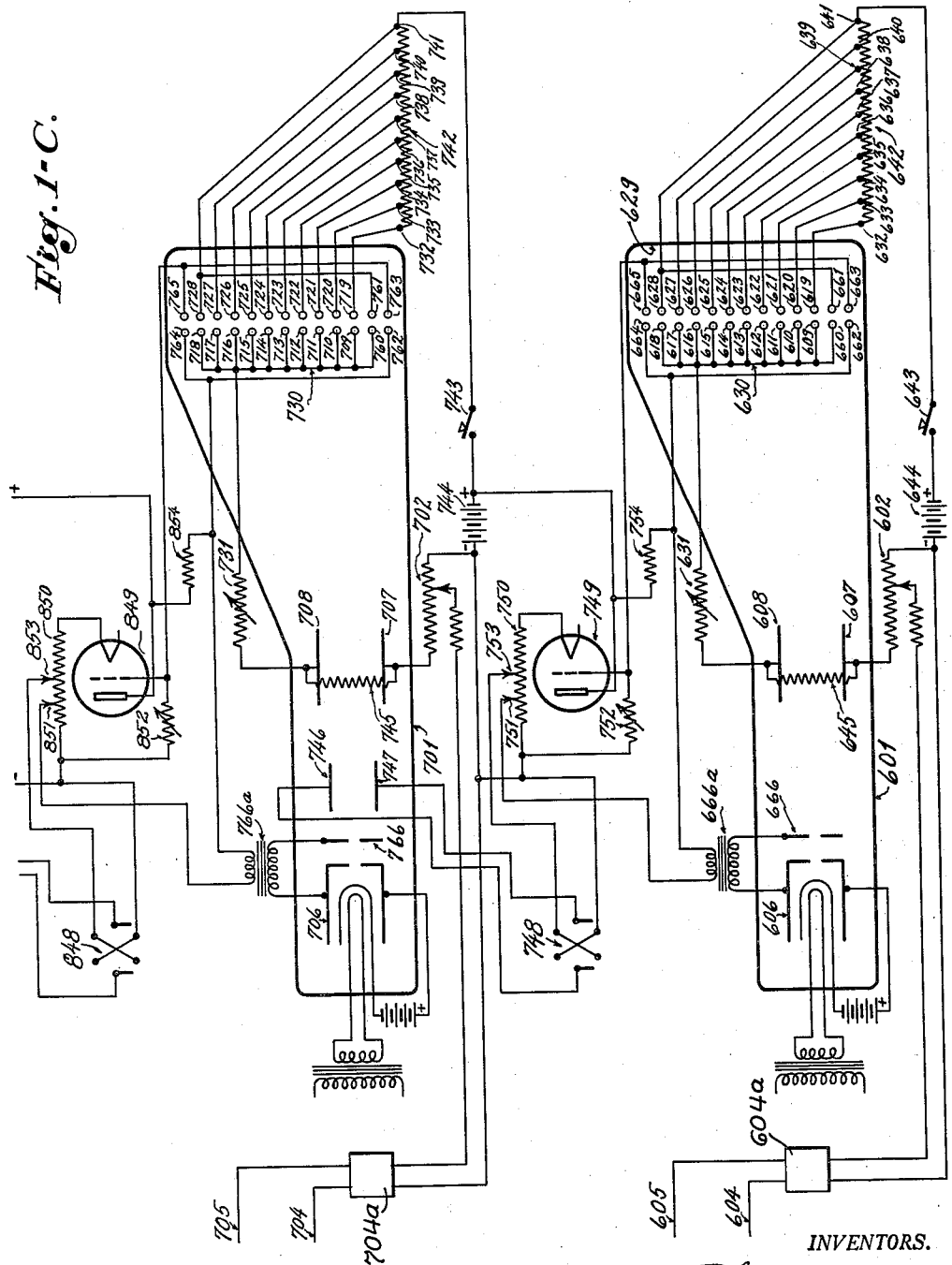
Fig. 1-C.

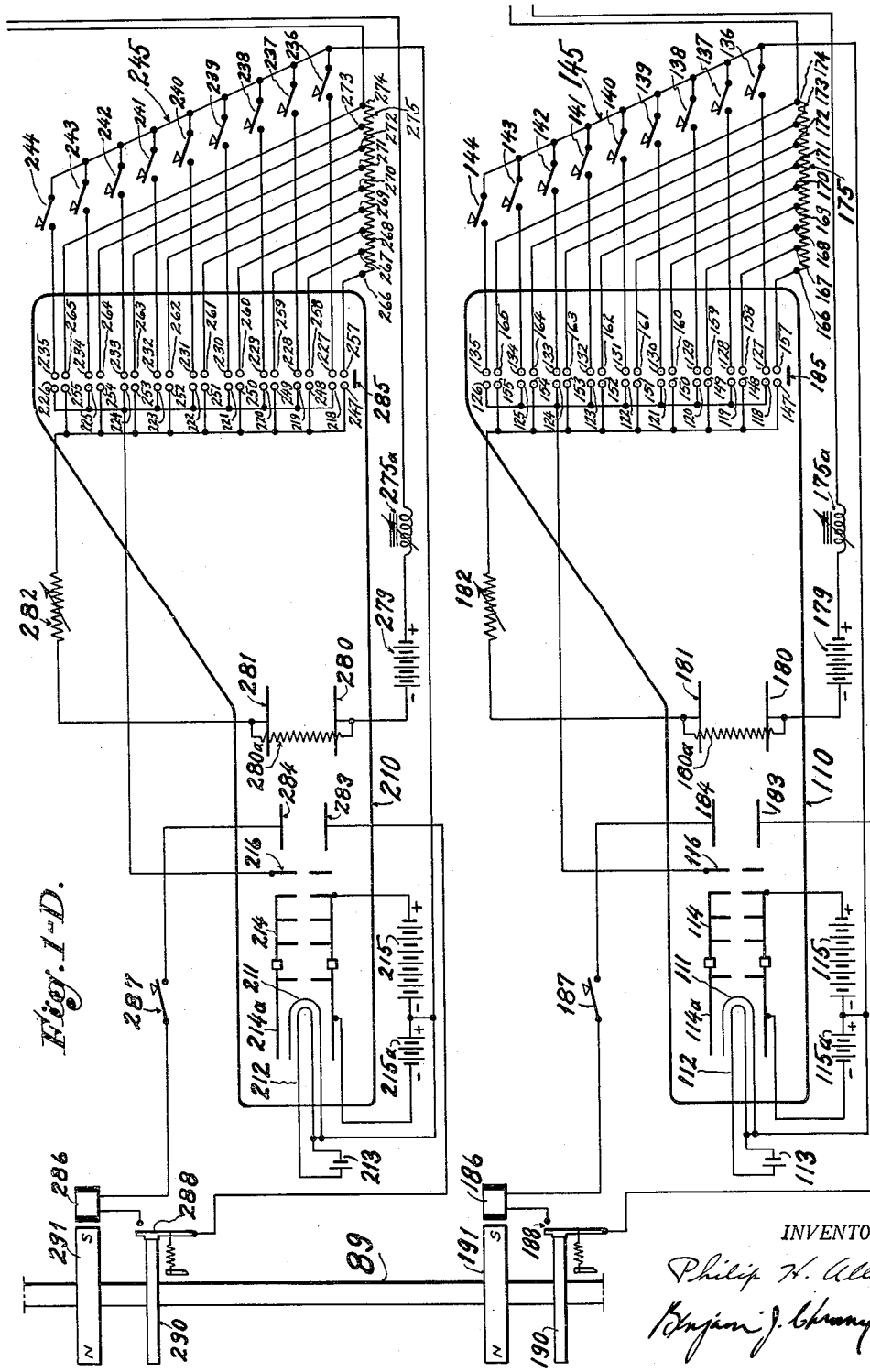

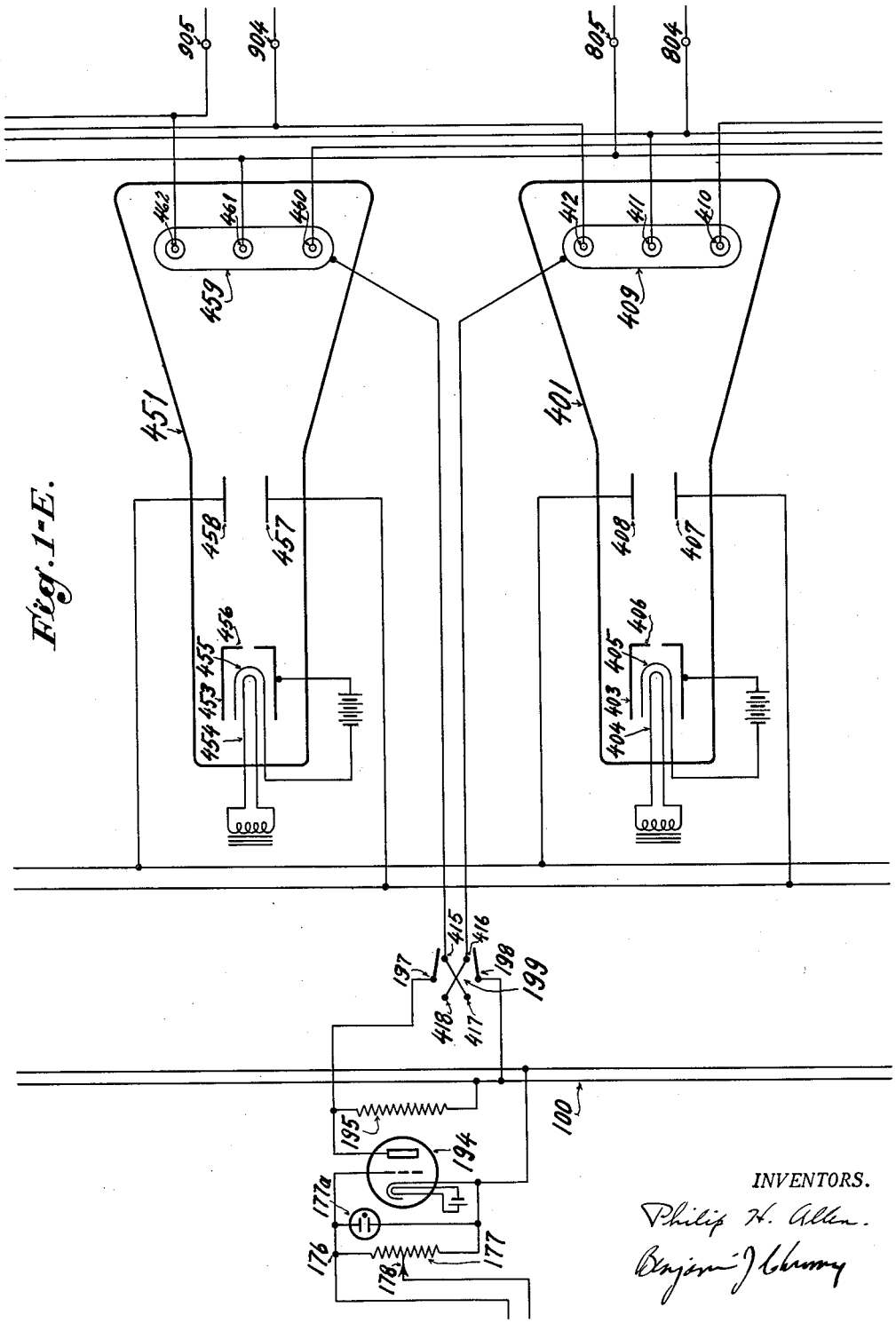

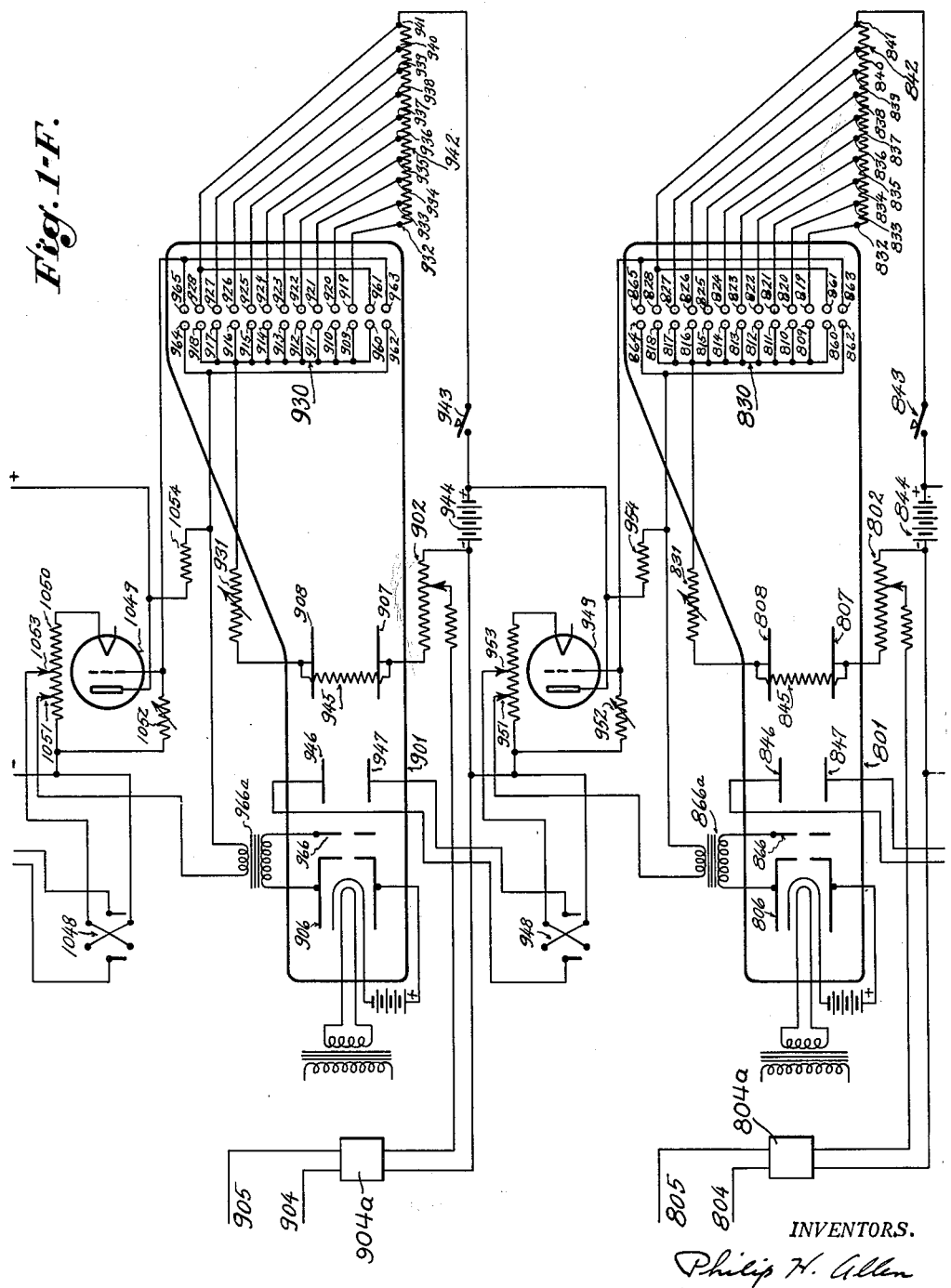

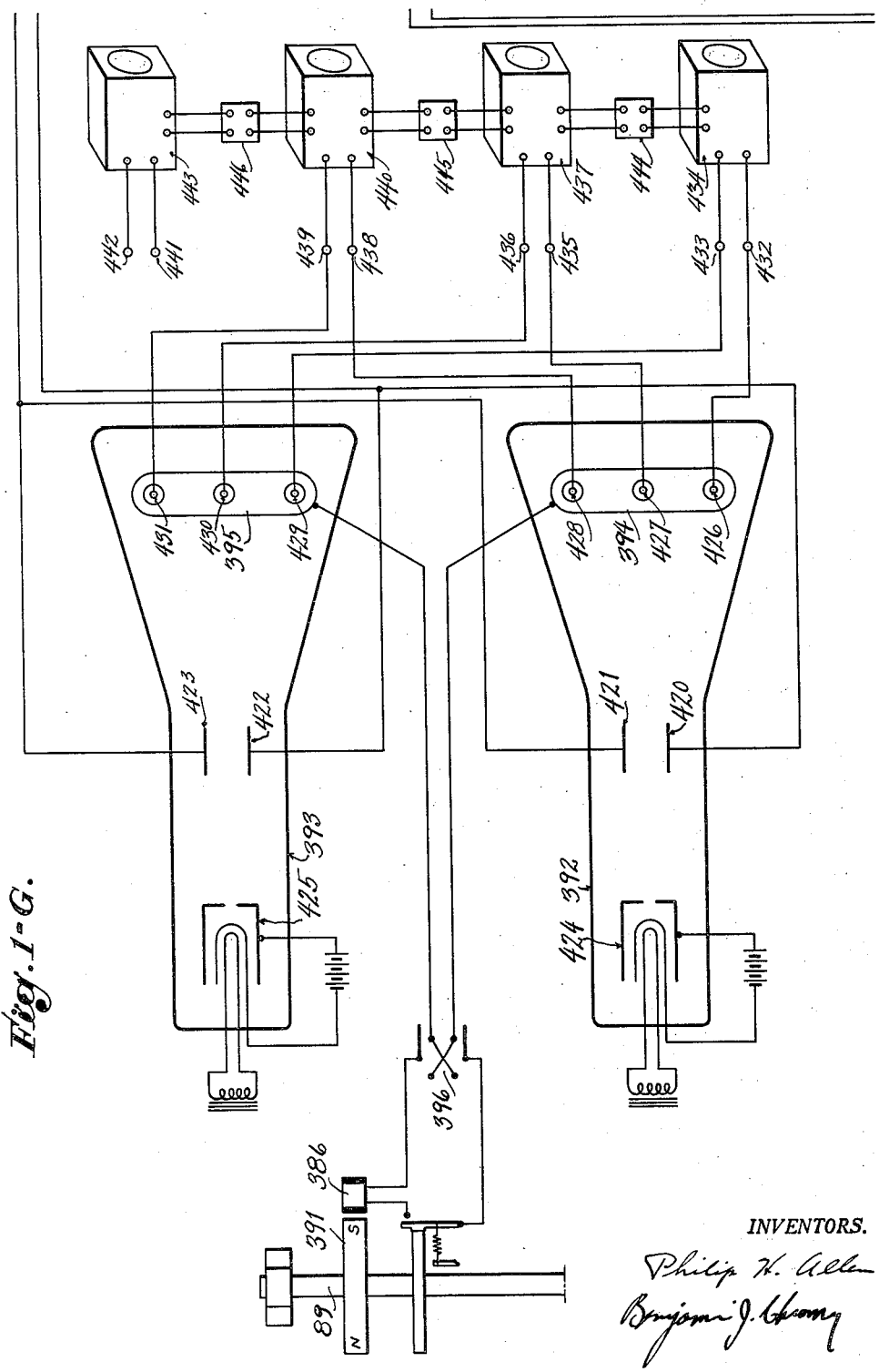
Fig. 1-G.
INVENTORS.
Philip H. Allen
Benjamin J. ...

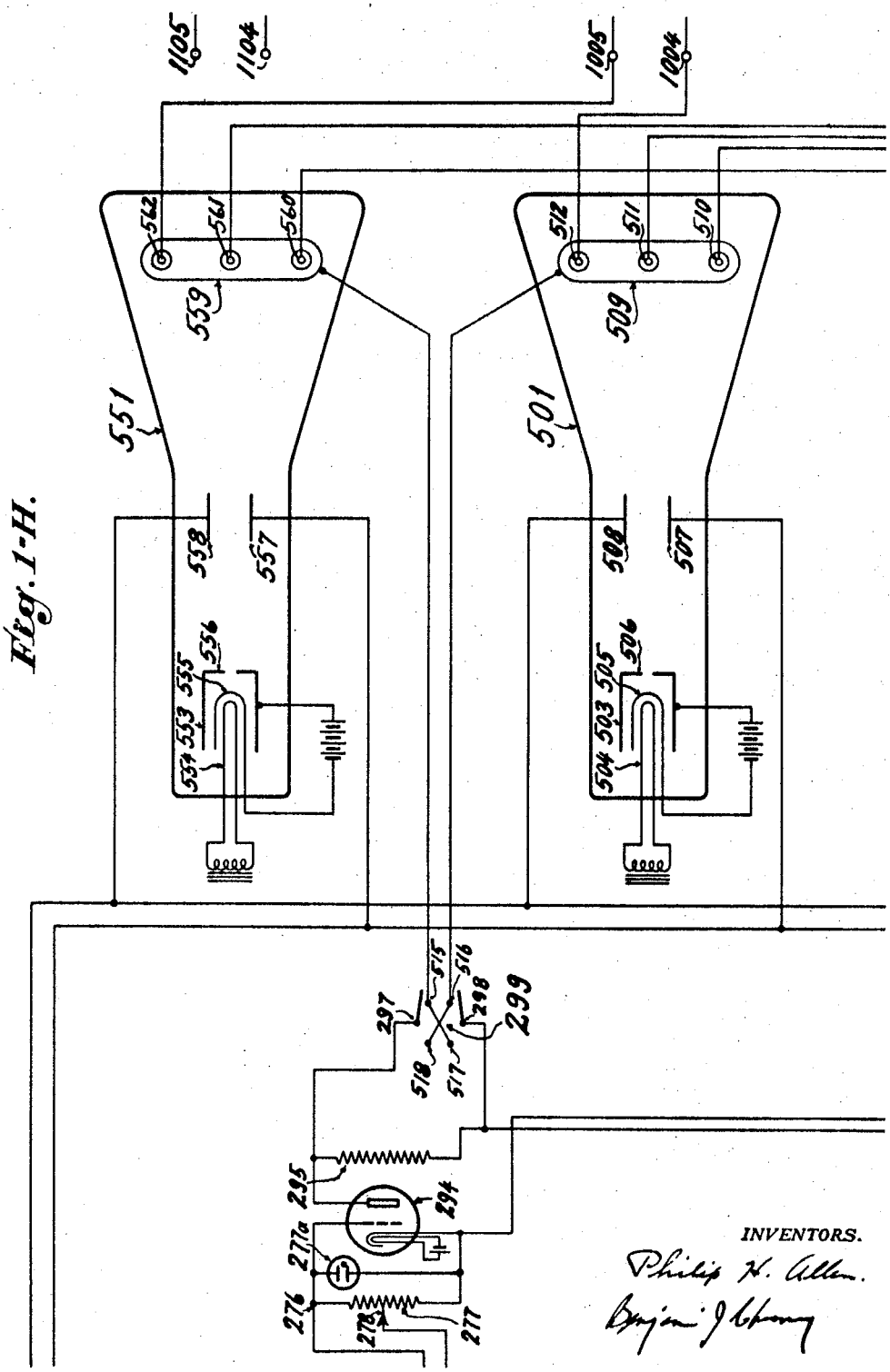

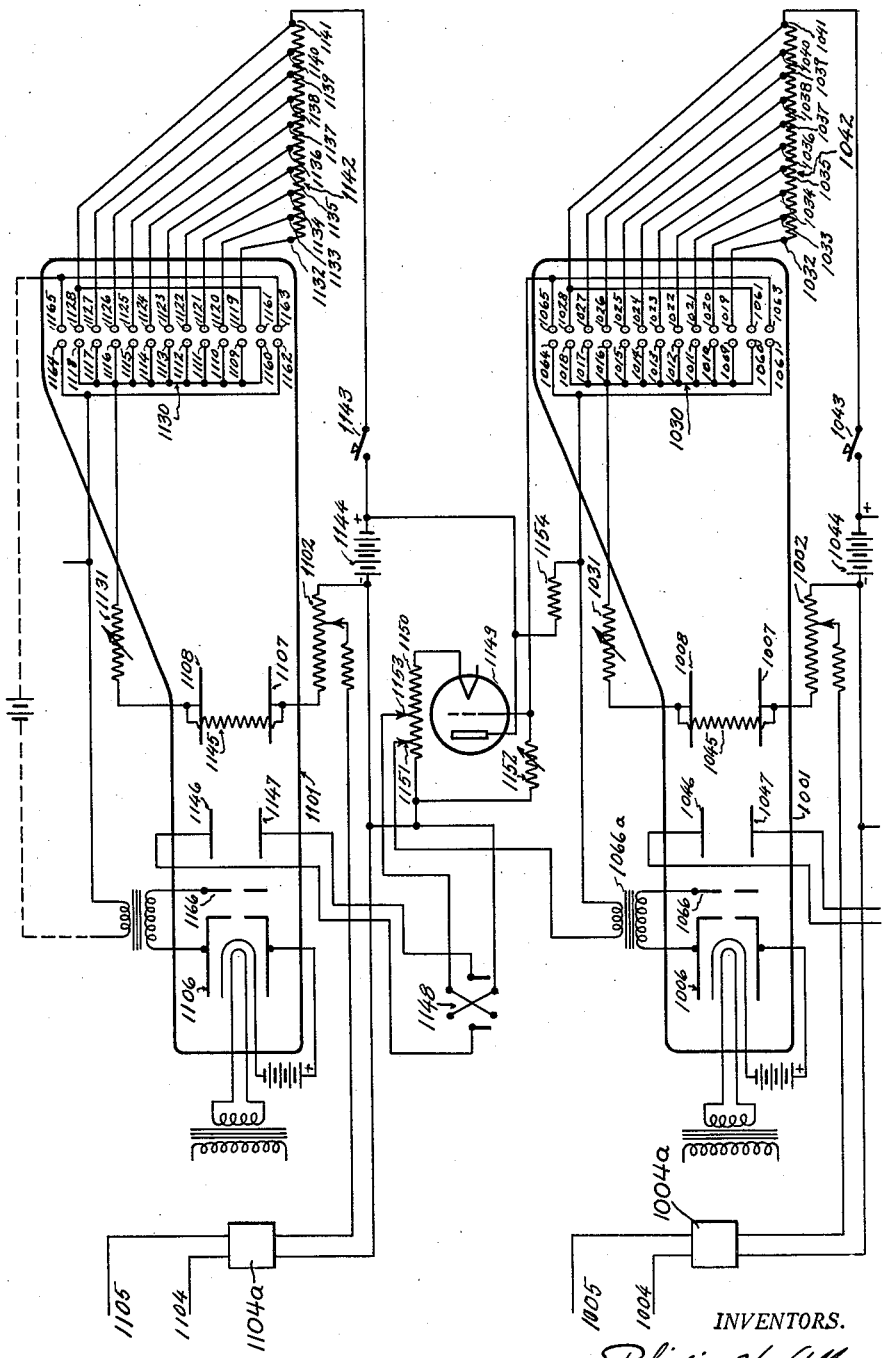

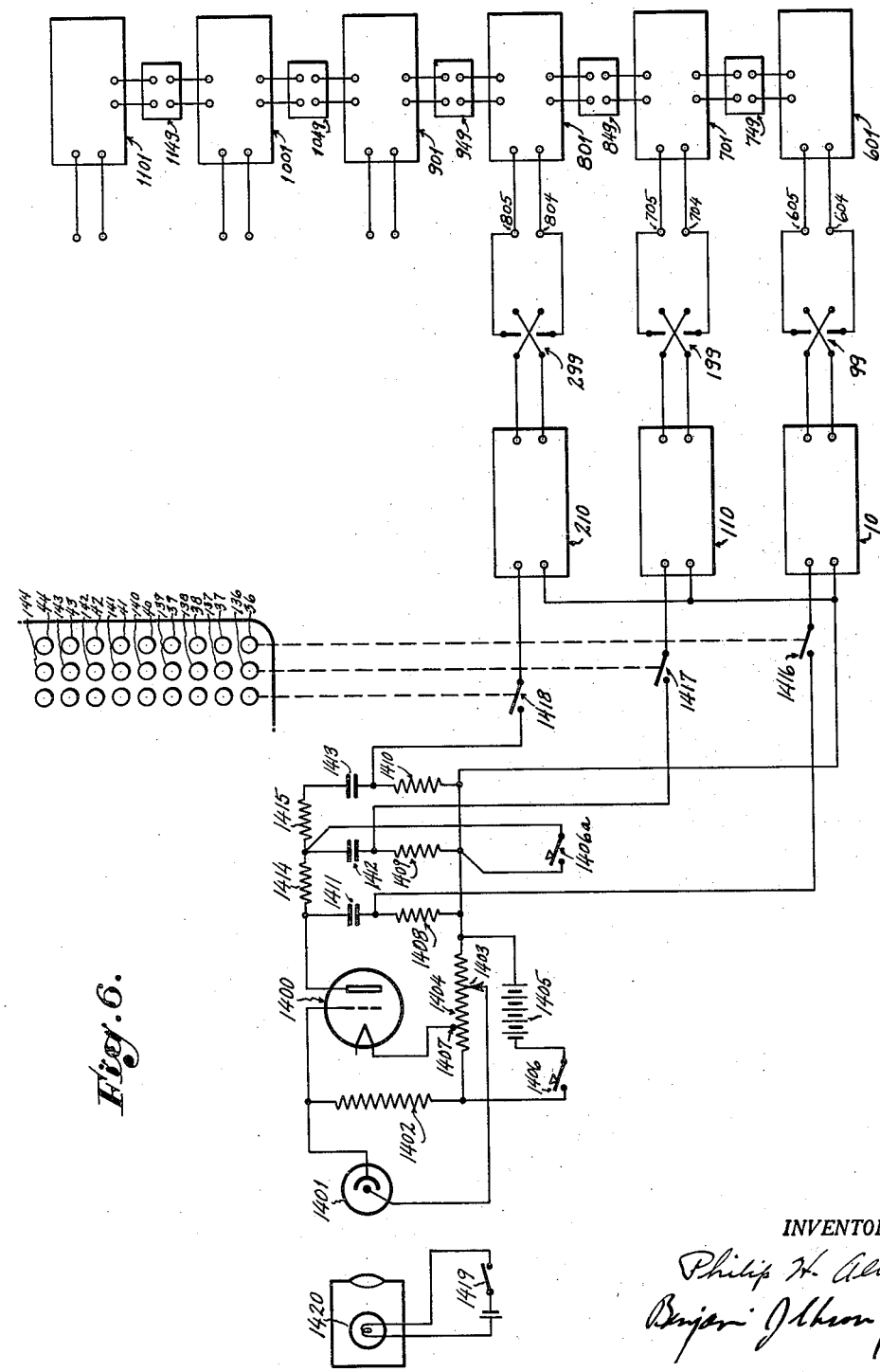

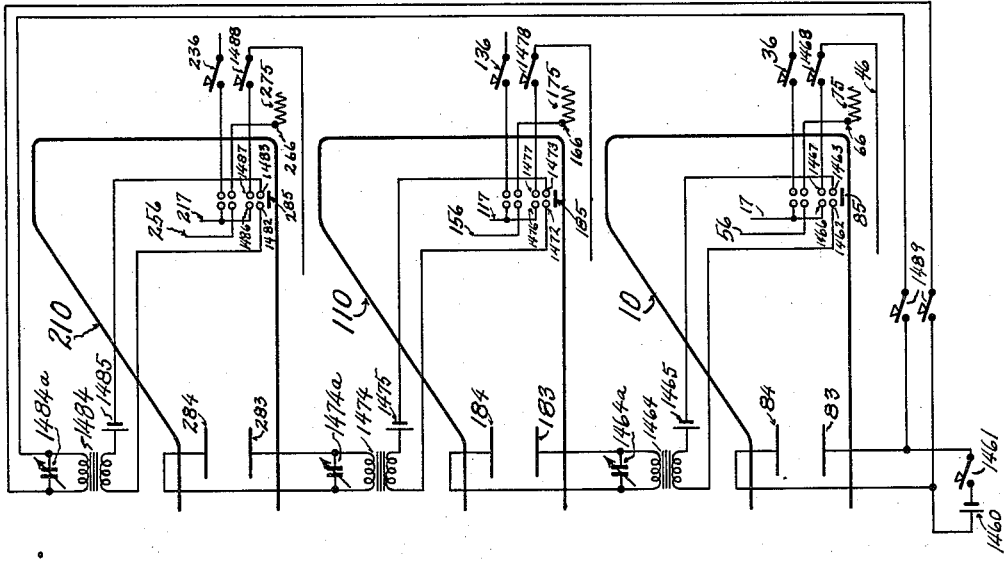
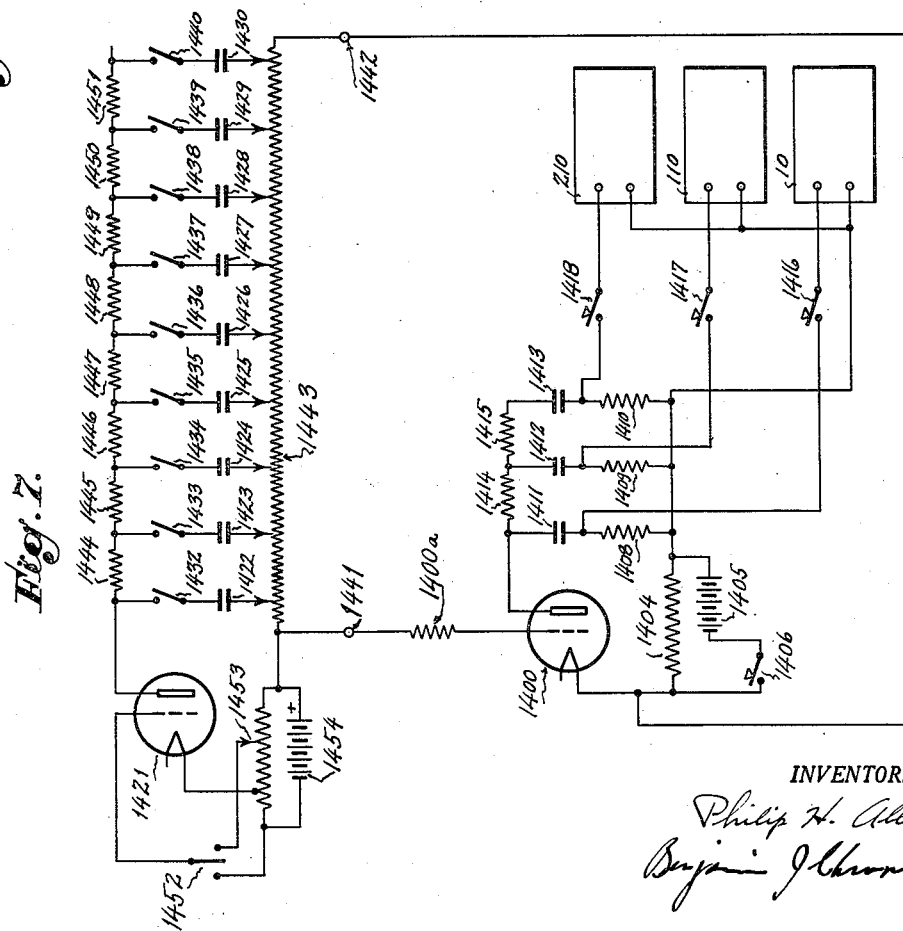
Fig. 8.
Fig. 7.
INVENTORS.
Philip H. Allen.

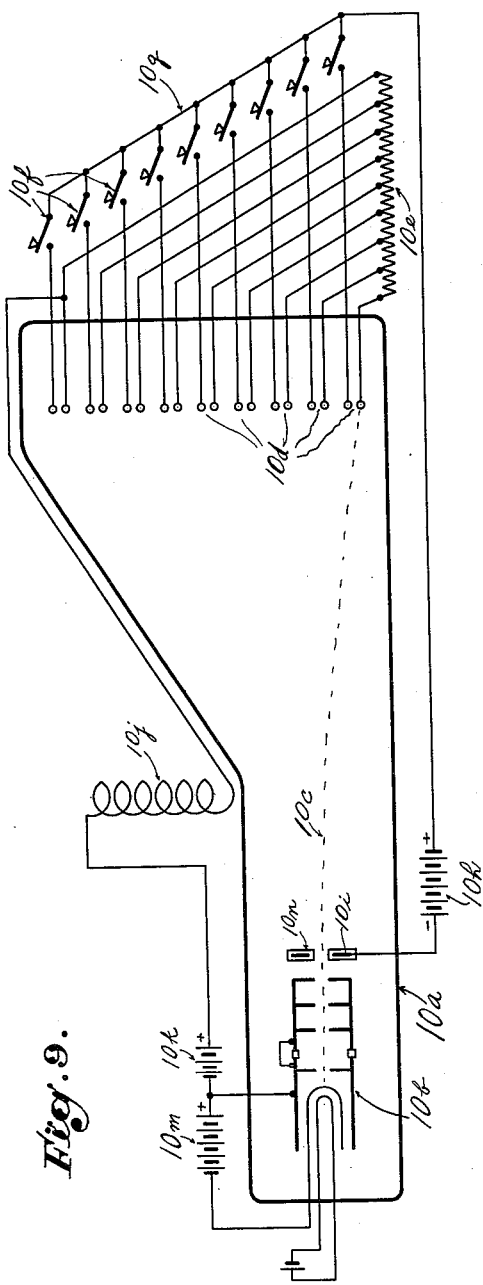

Sept. 17, 1963 P. H. ALLEN ETAL 3,104,316
REGISTERS
Filed Aug. 20, 1945 15 Sheets-Sheet 14

INVENTORS.
Philip H. Allen.
Benjamin J. Chang

Sept. 17, 1963 P. H. ALLEN ETAL 3,104,316
REGISTERS
Filed Aug. 20, 1945 15 Sheets-Sheet 15

| FIG. 1-G | FIG. 1-H | FIG. 1-I |
| FIG. 1-D | FIG. 1-E | FIG. 1-F |
| FIG. 1-A | FIG. 1-B | FIG. 1-C |

INVENTORS.
Philip H. Allen.
Benjamin J. Leemy

Patented Sept. 17, 1963

3,104,316
REGISTERS
Philip H. Allen, Orinda, Calif. (15335 Via Colina, Saratoga, Calif.), and Benjamin J. Chromy, Washington, D.C. (1677 Arch St., Berkeley, Calif.)
Filed Aug. 20, 1945, Ser. No. 611,608
33 Claims. (Cl. 235—160)

This invention relates to registering devices of electrical character and is concerned more particularly with devices of the above character known as calculating machines adapted to perform the four cardinal rules of calculation, i.e., addition, subtraction, multiplication and division. The invention is further concerned with the provision of fast operating electronic calculating devices, both for initiating the entry of values corresponding to the digits of a figure to be entered and for registering these values in a register also of electronic character so that the entire operation can be performed in a rapid and silent manner.

It is a general object of the invention to provide an electrical registering device of improved characteristics.

Another general object of the invention is to provide an electronic registering device for performing the four cardinal rules of computation.

Another general object of the invention is to provide an electronic calculating machine which operates in a cyclic fashion to perform the desired calculations.

A further object of the invention is to provide a new and rapid electronic selecting mechanism for a register.

Another object of the invention is to provide an improved electrical mechanism selectively operable to provide electrical indications corresponding to the various integers.

A further object of the invention is to provide an electronic mechanism for use as the selection mechanism of a calculator whose operation is initiated in a cyclic fashion so that repeated registering of the numbers entered into the selecting mechanism can be performed.

Another object of the invention is to provide a registering mechanism utilizing ultra high speed impulses in the order of the speed of light.

A further object of the invention is to provide an electronic impulse control mechanism for providing amplified impulses for use in a calculating operation.

Another object of the invention is to provide an electronic selection mechanism which is reversible in character and can transmit either positive or negative impulses in accordance with the sign character of the registration to be performed.

A further object of the invention is to provide a register mechanism employing a cathode ray tube as a part of the selecting mechanism of a calculating machine.

A further object of the invention is to provide a calculating machine which employs an electronic selection mechanism and an electronic accumulator.

A further object of the invention is to provide a calculating machine employing an electronic selecting mechanism and an electronic accumulator in which the various orders of the selecting mechanism can be selectively related to different orders of the accumulator.

Another object of the invention is to provide a calculating machine of the above character in which electronic devices are employed for changing or shifting the ordinal relation between the selecting mechanism and the accumulator.

A further object of the invention is to provide an electronic register or accumulator in which the values entered into the register are displayed by electronic means.

A further object of the invention is to provide a register of the above character in which the various orders of the register are responsive to electrical impulses.

Another object of the invention is to provide an electrical register for a calculating machine in which values can be registered by electrical impulses.

A further object of the invention is to provide a register of the above character that is responsive to both positive and negative electrical impluses so that either positive or negative values can be entered therein.

Another object of the invention is to provide a register of the above character having fluorescent indicia for displaying the values entered therein.

A further object of the invention is to provide a register of the above character in which transferred increments, either positive or negative, can be transmitted electronically from one order to the next adjacent higher order.

A further object of the invention is to provide a simultaneous electronic transfer for a register of the above character.

Another object of this invention is to provide a cathode ray tube device employing the cathode ray beam for closing selected circuits in an electrical calculating device.

Still another object of this invention is to provide a calculatnig apparatus employing cathode ray pulse producing devices for controlling the cathode ray beams of tubes employed for registering values in a calculating machine.

Still another object of this invention is to provide an electrical apparatus adapted for use in a calculator in which an automatically controlled cathode ray beam is employed for controlling selected circuits.

Still another object of this invention is to provide a cathode ray tube with a plurality of contacts adapted to be closed by the cathode ray beam automatically in a predetermined sequence.

Still another object of this invention is to provide an electrical circuit employing one or more cathode ray pulse producing devices, one or more cathode ray ordinal selecting devices, and one or more cathode ray registers or indicating devices.

Still another object of this invention is to provide a cathode ray tube with a plurality of contacts adapated to be closed by the cathode ray beam, the aforesaid cathode ray tube being provided with additional contacts connected to selectively extinguish the beam after predetermined ones of the circuit closing contacts have been closed.

Another object of the invention is to provide a cathode ray tube having a series of contacts adapted to be closed by the cathode ray beam in which the closing of one set of contacts applies a voltage to the deflecting plates to cause stepping of the beam to the next adjacent set of contacts.

Still another object of the invention is to provide a cathode ray tube having a series of contacts adapted to be closed by the cathode ray beam and connected in a circuit to maintain the cathode ray beam in contact closing relation with a given set of contacts after being initially deflected to impinge upon the contacts.

Other and further objects of this invention will be apparent to those skilled in the art to which it relates from the following specification and claims.

In accordance with this invention, there is provided an electrical arrangement employing a plurality of electronic devices of the cathode ray beam type in a calculating apparatus. For this purpose a number of cathode ray beam devices are connected to produce desired electrical pulses and are arranged in ordinal relation as the selection mechanism of the machine. The tubes of the selection mechanism are each associated with a row of nine value selecting keys which when depressed to enter values into the machine will determine selectively the number of pulses produced in each ordinal cathode ray tube, the cyclic operation of these tubes being provided by a cycle initiating mechanism which provides simultaneous firing pulses, one to each tube to initiate their operation.

In the embodiment shown each ordinal cathode ray tube of the selection mechanism has associated therewith a polarity reversing device whereby either positive or negative electrical pulses can be supplied by the tubes in accordance with whether or not an additive or a subtractive operation is to be performed.

The ordinal array of selection tubes are associated with an array of cathode ray tubes for shifting the ordinal position of entry of the pulses in the register to be referred to later, the ordinal shifting tubes having a common key control to select the respective circuits through which the pulses are to be transmitted.

The pulses transmitted through the ordinal shifting tubes are adapted for selective entry into an ordinal array of registering or accumulating cathode ray tubes. In the case of positive pulses produced for entry, the accumulating tubes are responsive to the number of pulses to change their registration in an additive fashion and correspondingly are responsive to negative pulses to change their registration in a negative fashion.

Each accumulating tube has incorporated therein transfer initiating devices which are responsive to passing of one tube from "9" to "0" or from "0" to "9" to enter a corresponding positive or negative pulse, respectively, in the accumulating tube of next higher order. This entry of the transferred increment or pulse is effected simultaneously with any pulses which may be in the course of entry in the higher order tube by virtue of the production of digitation pulses for such tube.

The apparatus is also provided with an electronic revolutions counter or register which comprises a pulse producing means operated in synchronism with the firing pulse for the selection tubes so that for each cycle of operation of the selection tubes one pulse is produced for entry in the revolutions counter. This pulse may be either positive or negative in accordance with the desired entry to be made in the counter, and is transferred through a cathode ray ordinal shifting tube to the selected counting tube of the revolutions counter which is of the same general character as those provided in the accumulator.

FIGURE 1 is a composite wiring diagram comprising FIGURES 1A to 1I, inclusive, illustrating a complete electronic apparatus for performing calculating operations. The arrangement of the parts of FIGURE 1 are shown in FIGURE 13.

FIGURE 2 is a fragmentary view of a modified form of register tube generally similar to those shown in FIGURES 1C, 1F and 1I.

FIGURE 3 is a fragmentary view of the screen and of the register tubes shown in FIGURES 1C, 1F and 1I illustrating the optical viewing arrangement for displaying the numerals registered by the register tubes.

FIGURE 4 is an elevational view of the fluorescent numerals on the register tube being taken as indicated by the line 4—4 in FIGURE 3.

FIGURE 5 is an elevational view of an electrode arrangement and the mounting means therefor in the register tube taken as indicated by the line 5—5 in FIGURE 3.

FIGURE 5A is a modified form of an electrode structure of the character shown in FIGURE 5.

FIGURE 5B is a second modified form of an electrode structure of the character shown in FIGURE 5.

FIGURE 6 is a schematic wiring diagram of a modified form of electronic calculating apparatus.

FIGURE 7 is a wiring diagram illustrating a modified form of selective pulse mechanism for supplying repeated pulses of a selected number to the selection tubes of the apparatus.

FIGURE 8 is a fragmentary wiring diagram of a modified form of the selection apparatus wherein the operation initiating pulses for the selection tubes are fed sequentially through the tubes from the lower through the higher orders thereof.

FIGURE 9 is a wiring diagram of a modified form of the invention which employs magnetic deflection of the cathode ray beam and is illustrated in connection with a selection tube.

*Selection Apparatus*

Figure 10:
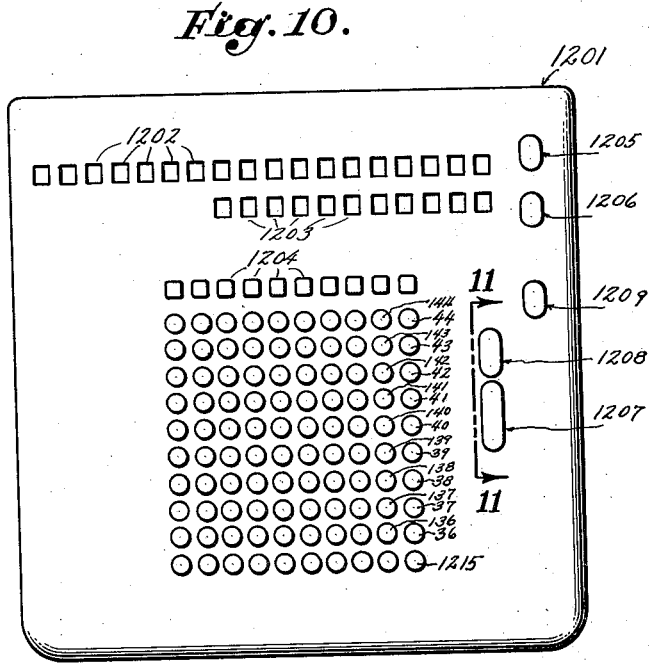
FIGURE 10 is a diagrammatic plan view illustrating the arrangement of the various registers, the keyboard and the key operated controls of the apparatus.

Referring to FIGURE 1A in detail, reference numeral 10 designates an electronic tube of the cathode ray beam type which is employed in conjunction with other related parts as one order of the selection apparatus. The tube 10 is provided with an electron gun employing a cathode 11 which may be of the indirectly heated type, and a filament 12 connected to a battery 13 or other current supply, a control electrode 14a connected to the positive or negative terminal of battery 15a and an anode 14 connected to the positive terminal of the battery 15, the negative terminal of this battery being connected to the cathode 11 and to the positive terminal of battery 15a. A quenching or de-focusing electrode 16, connected to the contact electrode bus 17, is provided for the purpose of quenching or de-focusing the cathode ray beam transmitted from the electron gun including the cathode 11, control electrode 14a and anode 14, as will be more fully described in further paragraphs of the specification. The contact electrode bus 17 is connected to a plurality of contacts 18 to 26, inclusive, which are provided with electron emitting surfaces from which the electron emission is stimulated by bombardment of the cathode ray beam. Associated with these contacts but slightly spaced therefrom are contacts 27 to 35, inclusive, respectively, and these latter contacts are connected to the manually operated value keys 36 to 44, inclusive, respectively. The value keys are shown schematically in FIGURE 1A. One terminal of each of these value keys 36 to 44, inclusive, is connected to the bus 45, as shown, and this bus is in turn connected through the wire 46 to the negative terminal of the battery 15. The cathode ray tube 10 is provided with an additional series of contacts 47 to 55, inclusive, connected to the electrode bus 56 and associated with this latter group of contacts 47 to 55, inclusive, is another group of contacts 57 to 65, inclusive. These contacts 47 to 55, inclusive, are associated with the contacts 57 to 65, inclusive, respectively.

Thus the series of contacts 18 to 26, inclusive, arranged in equally spaced relation opposite the corresponding spaced contacts 27 to 35, inclusive, form nine pairs of selective beam quenching contacts that are employed in controlling the production of a selected number of impulses from the tube 10. Likewise, contacts 47 to 55, inclusive, and 57 to 65, inclusive, also form nine pairs of equally spaced beam controlling contacts that are employed in producing and transmitting the selected number of impulses by effecting automatic stepping of the beam of the tube 10. All of these contacts that are of negative polarity by virtue of batteries 15 and 79, respectively, when the circuits thereof are closed, are provided with electron emitting surfaces giving profuse electron emission under the bombarding stimulus of the cathode ray beam originating at the cathode 11, as will be more fully described hereinafter.

The beam controlling contacts 57 to 65, inclusive, (FIGURE 1A) are respectively connected to the terminals 66 to 74 of the voltage dividing resistor 75. The terminal 74 of this resistor is also connected to the terminal 76 (FIGURE 1B) of the potentiometer 77, and the variable contactor 78 of this potentiometer is connected to the positive terminal of the cathode ray beam deflecting battery 79. The negative terminal of this battery is connected to the deflector plate 80 of the cathode ray tube 10 and the deflector plate 81, associated with the plate 80, is connected through a variable resistor 82 to the contact electrode bus 56.

An additional set of deflector electrodes 83 and 84 is provided in the cathode ray tube 10 for the purpose of applying the initiating or firing pulse to the electron beam of the cathode ray tube and moving this beam from its initial position, as will be more fully described hereinafter. These auxiliary deflector electrodes 83 and 84 are connected to the pickup coil 86 through switches 87 and 88. The switch 87 is adapted to be closed whenever any one of the keys 36 to 44, inclusive, is closed and details of this structural arrangement are more fully set forth hereinafter in connection with the description of FIGURE 12. Switch 88 is a cam-operated switch adapted to be closed by the cam 90 only during one-half of the revolution of the shaft 89, so that an initiating pulse of only a predetermined polarity is applied to the auxiliary deflector electrodes 83—84.

The shaft 89 is a part of the cycling or firing pulse means, and has mounted thereon a permanent magnet 91, which in the full cycle position of the parts, occupies the position shown in FIGURE 1A with respect to the pickup coil 86. The shaft 89 is adapted to be cyclically driven by means of a cyclic clutch 92 from an electric motor 93. The cyclic clutch 92 is of conventional construction, being generally of the character disclosed in the patent to Carl M. Friden, No. 2,279,455, dated April 14, 1942, and being similarly controlled in a manner later described in connection with FIGURE 11 to produce one or more complete cycles of movement of the shaft 89, the cam 90 and the magnet 91, as more fully explained hereinafter.

The indirectly heated cathode 11, control electrode 14a, anode 14 forming parts of the electron gun and vertically deflecting electrodes 80 and 81 of the cathode ray tube 10 may be of generally the same construction as corresponding parts of cathode ray tubes now manufactured. The quenching or de-focusing electrode 16 may be positioned on either side of the anode 14, that is, it may be positioned either between the anode 14 and the auxiliary deflecting electrodes 83, 84 or between the anode 14 and the cathode 11. Furthermore, the auxiliary deflecting electrodes 83, 84 may, if desired, be positioned between the anode 14 and the de-focusing or quenching electrode 16, or they may be positioned on the other side of the deflector plates 80, 81.

The cathode ray tubes 110 and 210 are of the same construction as the cathode ray tube 10. The respective parts of the cathode ray tubes 10, 110 and 210 are similarly numbered and the corresponding reference numerals applied to the tubes 10 and 110 and associated apparatus are numbered so as to differ by 100, for example, the cathode of the tube 10 is designated by reference numeral 11 and the cathode of the tube 110 is designated by the reference numeral 111. Likewise, the reference numerals applied to the tubes 110 and 210 and the corresponding parts differ by 100 so that the cathode of the tube 210 is designated by reference numeral 211.

The electrical pulses produced by the selection tube 10 as the cathode ray beam transmitted by the electron gun of this tube is stepped across a predetermined number of pairs of the contact electrodes 47 to 65, inclusive, are impressed upon the portion of the potentiometer 77 (FIGURE 1B) between the terminal 76 and contactor 78 and accordingly upon the grid circuit of the tube 94 since the potentiometer 77 is connected to the grid and cathode of the amplifier tube 94. The output of the amplifier 94 is impressed on the double pole double throw reversing switch 99 since the anode of this amplifier tube is connected to the terminal 97 of the reversing switch 99 and the terminal 98 of the switch 99 is connected to the positive terminal of the battery 96. The positive terminal of this battery 96 is connected to the conductor 100 which is connected to the lower terminals of all of the anode resistors 95, 195 and 295 so that anode current is fed to all of the amplifier tubes 94, 194 and 294 from the same source through the aforesaid resistors, respectively, since these resistors are connected to the anodes of these respective tubes.

The external circuits associated with the cathode ray tubes 10, 110 and 210 are all similar, as will be seen by reference to the drawing, up to the output circuits of the amplifier tubes 94, 194 and 294 and the reversing switches 99, 199 and 299. It will be seen by reference to the drawings that the contactors of the tubes 10, 110 and 210 are divided into two sets, one set being connected to the manually settable keys 36 to 44, inclusive, in the case of the tube 10, and the other set being connected to the voltage dividing resistor 75. It will be observed that one side of each of these sets of contactors is connected to one of the common buses 17 or 56 in the case of selection tube 10, buses 117 or 156 in tube 110 and buses 217 or 256 in tube 210, as illustrated. In the case of the two sets of contactors provided to the cathode ray tube 110, one set is connected to the manually settable keys 136 to 144, inclusive, and the other set of contactors is connected to the voltage divider 175. A similar arrangement of manually settable keys 236 to 244, inclusive, is connected to one side of one set of the contacts of the cathode ray tube 210 and one side of the other set of contacts of this tube 210 is connected to the voltage dividing resistor 275.

The potentiometer 177 associated with the second selection tube 110 is connected with its terminal 176 to the grid of the amplifier tube 194 and to the terminal 174 of the voltage divider 175. The variable contactor of this potentiometer 177 is connected to the positive terminal of the battery 179. A similar potentiometer 277 is associated with the selection tube 210 and in this case the terminal 276 of the potentiometer is connected to the grid of the tube 294 and to the terminal 274 of the voltage divider 275. The variable contactor 278 of the potentiometer 277 is, in this case, connected to the positive terminal of the battery 279.

*Operation of the Selection Circuit*

The above-described circuit and associated parts comprise a cyclically operable selection means of three orders in any one of which any selected number of electrical pulses from one to nine may be produced during each cycle of operation. It will be understood that while only three cathode ray tubes 10, 110 and 210 are shown, these may be multiplied in accordance with the number of orders desired in the selection circuit.

To condition the selection circuit for operation, one of the keys 36 to 44, one of the keys 136 to 144 and one of the keys 236 to 244 are depressed to represent the value to be entered into the machine. For example, if the number 473 is to be entered into the machine, the key 38 or number "3" key of the units order is depressed, the key 142 or number "7" key of the tens order is depressed and the key 239 or number "4" key of the hundreds order is depressed. This setting of the respective keys conditions the units order to produce three electrical pulses for each cycle of operation, the tens order seven electrical pulses and the hundreds order four electrical pulses, as will be apparent from the following description.

The number of times the item is to be entered into the register is controlled by the number of rotations of the shaft 89, i.e., the number of rotations of the permanent magnets 91, 191 and 291 with respect to their respective pickup coils 86, 186 and 286, the number of cycles being controlled by the length of time the clutch 92 is maintained engaged.

With the parts conditioned as described above, the key 1207 (FIGURE 11) is operated and let us assume immediately released to cause one cycle of operation of the selection mechanism, i.e., one rotation of the shaft 89, the cams 90, 190 and 290 and the magnets 91, 191 and 291. In the position of the parts shown in FIGURE 1A, the switches 88, 188 and 288 associated with the leads to the pickup coils 86, 186 and 286 are open, being engaged with the low portions of the cams 90, 190 and 290. With this condition of the parts the south poles of the respective magnets 91, 191 and 291 are ineffective with respect to the associated pickup coils 86, 186 and 286. During the rotation of the shaft 89 and the respective cams 90, 190 and 290, the respective switches 88, 188 and 288 are closed for approximately one-half cycle beginning about 90° from the full cycle position of the parts shown in FIGURE 1A and continuing for approximately 180° of rotation thereafter so that the switches 88, 188 and 288 are closed to enable the respective circuits for the pickup coils 86, 186 and 286 as the north poles of the magnets 91, 191 and 291 are sweeping past the associated pickup coils.

It will be recalled also that setting of the respective keys 39, 142 and 238 serves to close the normally opened switches 87, 187 and 287 to further condition the circuit of the pickup coils 86, 186 and 286 with respect to the auxiliary deflector plates 83, 84, 183, 184 and 283, 284, respectively.

As a part of conditioning the machine for operation, it is also to be assumed that the supply batteries 13, 113 and 213, control electrode batteries 15a, 115a and 215a and the anode batteries 15, 115 and 215 are connected so that the cathode ray beams of the respective tubes 10, 110 and 210 are on and are impinging against their respective rest positions 85, 185 and 285.

The effect of the rotation of the north pole of the magnet 91 (FIGURE 1A) past associated pickup coil 86 is to apply an electrical pulse to the auxiliary deflector plates or electrodes 83, 84 of tube 10 to raise the beam from its rest position 85 to impinge upon and close the circuit between the respective contacts 47 and 57, the electron flow from the electron emissive surfaces of one of these contacts effectively closes the circuit therebetween so that the terminal 66 of the voltage dividing resistor 75 is connected through the contacts 57, 47 to the electrode bus 56 through the variable resistor 82 to the main deflector plate 81, the cooperating deflector plate 80 being connected through the battery 79, the variable contactor 78, a portion of the resistor 77 and the voltage divider 75 to apply a potential between the plates 80 and 81 across resistor 80a sufficient to raise the cathode ray beam from the contacts 47 and 57 to the contacts 48 and 58. When the circuit between the contacts 47 and 57 is closed, a pulse is applied to the input circuit of the amplifier tube 94 (FIGURE 1B) through the portion of the potentiometer between the variable contactor 78 and the terminal 76; this pulse is amplified and the amplified pulse applied across the reversing switch 99.

It will be noted that in raising the beam from the contacts 47, 57 (FIGURE 1A) to the contacts 48, 58 it has passed across the contacts 18—27 and closed the circuits therebetween. However, the circuit including these contacts is open at the key 36 so that no result obtains. When the beam impinges upon the contacts 48, 58, another pulse is applied to the input circuit of the amplifier 94 through the portion of the potentiometer between the terminal 76 and the variable contactor 78. At the same time the portion of the voltage divider between the terminal 66 and the tap 67 is by-passed and as a result a higher voltage is applied from the source 79 to the deflector plates 80 and 81 across the resistor 80a, this higher voltage being sufficient to move or deflect the cathode ray beam from the electrodes 48—58, across the electrodes 19—28 and to the electrodes 49—59.

Since the key 37 is open, no result is produced when the beam is swept across the electrodes 19—28. However, a third pulse is impressed upon the input circuit of the amplifier 94 through the portion of the potentiometer 77 between the terminal 76 and the variable contactor 78.

When the beam of the cathode ray tube was moved to impinge upon the contacts or electrodes 49—59, the section of the voltage divider 75 between the taps 67 and 68 was by-passed, as well as the previously by-passed section between the terminal 66 and tap 67 so that the voltage applied between the deflector plates 80 and 81 across resistor 80a is again increased. The beam is again moved or deflected upward. However, it will be noted that the key 38 is depressed and the contacts thereof closed so that when the beam of the cathode ray tube impinges upon the electrodes 20—29 in its upward movement it effectively closes the gap between these two contacts and a negative potential is applied upon the quenching or de-focusing electrode 16 so that the beam of the cathode ray tube is quenched or substantially quenched and as a result the circuit between the electrodes 20—29 is open thereby removing the quenching potential from the electrode 16. However, it will be observed that the potential from the battery 79 is also removed from the deflector electrode 81 so that when the beam of the cathode ray tube is reestablished it impinges upon the rest position 85 and will continue to impinge upon this position until another pulse is applied to the auxiliary deflector electrodes 83, 84, as previously described.

It will be observed that the stepping of the cathode ray beam of the selection tube 10 was automatic once it was raised or deflected from its rest position 85 to the first pair of contactors 47—57 until it reached the selected pair of quench contactors 20—29 connected to the depressed key 38. Very rapid stepping of the beam is obtained in this manner and the rapidity of this beam stepping may be controlled by the choke 75a which may be a variable inductance. This choke 75a may be a resistor shunted condenser, if desired, the condenser being charged by the electric pulse from the battery 79 and being discharged through the resistor shunt. While the conductor 46 connected to the common bus 45 of the manually settable keys 36 to 44, inclusive, is shown as connected to the negative terminal of the battery 15 and the cathode 11 is also shown as connected to this same terminal so that when the de-focusing or quenching electrode 16 is energized it is in effect connected to the cathode 11, it is obvious that the cathode 11 may be connected to some intermediate point of the battery 15 by means of taps or a suitable voltage divider so that the electrode 16 may be made negative with respect to the cathode when it is energized. However, under certain conditions it may not be desirable to make the electrode 16 more negative than the cathode since the purpose of this invention may be accomplished simply by de-focusing the beam and this may be accomplished by simply making the electrode 16 negative with respect to the anode 14.

The beam of any one or all of the cathode ray tubes 10, 110 and 210 may be focused or adjusted so that it is sufficiently large in effective cross-section to be able to establish the circuit between a group of electrodes, such as, electrodes 47—57 and 18—27 simultaneously, and in this way the quenching or de-focusing circuit of the electrode 16 may be energized as soon as the beam is moved up to the appropriate group of electrodes.

As noted above, the manually settable key 142 connected to the electrode 133 of the pair 124—133 of the cathode ray tube 110, which key corresponds to the number "7," was also set. Therefore, the beam of the cathode ray tube 110 was stepped up to the electrodes 153—163 over the electrodes 147—157, 118—127, 148—158, 119—128, 149—159, 120—129, 150—160, 121—130, 151—161, 122—131, 152—162, 123—132, 153—163 and to the electrodes 124—133, and since the manually settable key 142 was closed the de-focusing or quenching electrode 116 was energized and the beam of the cathode ray tube 110 was quenched or de-focused so that the circuit thereof was interrupted at the electrodes 124—133. When the beam is re-established, it is in the rest or normal position 185. During the course of the movement of the beam over the electrodes 147—157, 148—158, 149—159, 150—160, 151—161, 152—162 and 153—163, a series of seven pulses was impressed upon the input of the amplifier tube 194 through the portion of the potentiometer 177 between the variable contactor 178 and terminal 176 thereof.

Since the key 239 connected to the electrode 230 of the electrode pair 221—230 of the cathode ray tube 210 was closed, as previously described, the beam of this cathode ray tube advances over the electrodes 247—257, 218—227, 248—258, 219—228, 249—259, 220—229, 250—260 up to electrodes 221—230, and four electric pulses are applied to the input circuit of the amplifier tube 294 before the quenching electrode 216 is energized. When the quenching electrode 216 is energized, the beam of the tube 210 is quenched or de-focused and when it is re-established it appears at the rest position 285.

It will be observed that as the beam of the cathode ray tube was moved upward over the electrodes of the tube 10, section after section of the voltage divider 75 was by-passed until only the portion thereof between the tap 68 and the terminal 74 remained in the circuit of the deflector plates 80 and 81 and resistor 180a connected across the deflector plates. It is therefore apparent that the voltage between the variable contactor 78 and terminal 76 of the potentiometer 77 increased step by step as the sections between the terminal 66 and the tap 68 of the voltage divider 75 were progressively by-passed out of circuit. However, compensation for this voltage rise may be applied by employing a voltage regulator tube 77a connected across the potentiometer 77 and this voltage regulator tube may be made to function to keep the voltage across the potentiometer substantially constant. Similar voltage regulator tubes 177a and 277a may be connected across the potentiometers 177 and 277, respectively.

The voltage regulator tube 77a functions to supply uniform pulses to the control grid of tube 94 in the following manner: when the circuit between the electrodes 47 and 57 is effectively closed by the cathode ray beam of tube 10 a current is caused to flow in the circuit including the upper portion of the potentiometer 77, that is, the portion of the resistance of this potentiometer between the movable contact 78 and the upper terminal 76 thereof. This current produces a potential drop across this portion of the potentiometer 77. This potential drop is applied across the indirectly heated cathode diode voltage regulator tube 77a through the lower part of the potentiometer resistance, that is the portion between the variable contact 78 and the lower terminal of the resistance of this potentiometer. The gas in the tube 77a is ionized thereby and the resistance of this tube then decreases as a result of the ionization of its gas atmosphere. Consequently the tube 77a tends to draw a substantially larger current than that supplied by the aforesaid ionizing potential. As a result, the voltage drop across the lower part of the potentiometer resistance increases and prevents continued ionization in this regulator tube. The circuit including the variable tap 78 and variable inductor 75a may be adjusted so that this action is repeated each time as the beam of tube 10 is stepped across contact pairs 47—57, 48—58, 49—59, 50—60, 51—61, etc., with the result that the step voltage across the upper part of the potentiometer 77 is converted into pulses of uniform amplitude which are supplied to the control grid of tube 94.

The voltage regulator tubes 77a, 177a and 277a are preferably of the indirectly heated cathode-diode type inasmuch as these regulator tubes are required to regulate a relatively small voltage such as is applied to the inputs of the amplifier tubes. Where desired, voltage regulator tubes of type 77a, 177a and 277a may be connected across the amplifier output resistors 95, 195 and 295, respectively, or if desired, voltage regulator tubes may be connected across the terminals 604—605, 704—705, 804—805, 904—905, 1004—1005, respectively; however, in this latter case inasmuch as either one of these pairs of terminals may be either positive or negative, either a pair of voltage regulator tubes inversely connected, that is, cathode-to-anode and anode-to-cathode, respectively, or a single voltage regulator tube having a pair of indirectly heated electrodes may be used. If a single voltage regulator tube is used then one of the indirectly heated electrodes is, of course, connected to the terminal 604 and the other is connected to the terminal 605 for the terminals 604—605, so that the maximum voltages of the relatively low voltage pulses appearing across these terminals may be effectively regulated. Similar connections may be made to the other pairs of terminals. Use of small voltage regulator tubes across the aforesaid pairs of terminals is desirable inasmuch as such regulator tubes function to eliminate transients riding on the voltage pulses fed through these pairs of terminals.

While the connections to the potentiometers 77, 177 and 277 as shown in the drawing apply positive pulses to the grids of the amplifier tubes, it is of course obvious that by reversing the connections feeding the amplifier tubes, negative pulses may be applied to the inputs thereof.

In cases where it is desired to use cathode ray tubes 10, 110 and 210 of a rather high vacuum type, it is desirable to connect resistors 80a, 180a and 280a across the deflectors 80—81, 180—181 and 280—281, respectively, as shown, so that it is not necessary to rely upon any electron emission from these deflector plates for a current flow through the potentiometers 77, 177 and 277, respectively, as the respective cathode ray tube beams advance over the associated contacts. These resistors would not be necessary in gas-type cathode ray tubes, although it may of course be desirable to use them even in the gas tubes and, of course, these resistors are of the order of a megohm each, although the value thereof depends upon the design of the cathode ray tubes and associated circuits.

While the operation of advancing the cathode ray beams of the tubes 10, 110 and 210 was described in sequence, it is apparent that this is a simultaneous operation since the initiating impulse picked up by the coils 86, 186 and 286 and applied to the auxiliary deflectors 83—84, 183—184 and 283—284, respectively, was applied simultaneously. However, these operations do not necessarily need to be simultaneous and, in fact, it may be desirable to stagger the respective operations so that the pulse applied to the auxiliary deflectors 83—84 of tube 10 is applied first, and the beam of this tube is caused to traverse the contacts thereof and apply the desired number of pulses to the input of the amplifier tube 94 before the initiating pulse is applied to the auxiliary deflectors 183—184 of the tube 110 and this tube caused to apply the desired number of pulses to the input of the amplifier 194 before the auxiliary electrodes 283—284 of the tube 210 are energized and this tube caused to transmit the desired number of pulses to the amplifier tube 294. Furthermore, pulse delaying chokes 175a and 275a, similar to the choke or condenser-resistor combination connected in series with the deflector battery 79 of tube 10, may be connected in series with the battery 179 of tube 110 and battery 279 of tube 210 for the same purpose of delaying the stepping of the beams of these tubes through the delay of the pulse production in the deflector circuits of these tubes. In cases where resistor shunted condensers are connected in series with the batteries 79, 179 and 279, the delay introduced into the circuit may be readily computed by obtaining the time constant from the resistance and capacity values for the elements used.

Ordinal Relation Shifting Apparatus

As previously explained, the selected pulses from the selection tubes 10, 110 and 210 can be entered selectively in various ordinal positions of the accumulator and for this purpose an ordinal shifting circuit is provided, including a plurality of pairs of ordinal shift tubes 301—351, 401—451 and 501—551 (FIGURE 1B) of the cathode ray type, together with a plurality of keys 302, 402 and 502 which serve, when depressed, to select the point of ordinal entry of the values from the respective selection tubes. Briefly, depression of key 302 will condition the ordinal shift tubes to cause entry of the selected pulses in the three lowest orders of the register, depression of key 402 will cause entry of these values in the second, third and fourth orders of the register, while depression of key 502 will cause entry of the values in the third, fourth and fifth orders of the register, as will be described in greater detail hereinafter.

The cathode ray tube 301 is provided with an electron gun 303 similar to the electron gun of the tube 10, which may be of a conventional type consisting of a heater filament 304 connected to a suitable current supply, such as an alternating current transformer secondary, an electron emitting cathode 305 indirectly heated from the heater filament 304, a control electrode (not shown) and one or more anodes, such as 306 connected to the positive terminal of a source of current supply, the negative terminal of which is connected to the cathode 305. This electron gun is arranged to transmit a beam of electrons substantially axially down the length of the tube 301 between the deflector electrodes 307 and 308 to the contact electrodes 309, 310, 311 and 312. These contact electrodes are provided with electron emissive coatings so that when these electrodes are under bombardment by the electron beam supplied by the electron gun 303, the potential existing between the elongated electrode 309 and any one of the electrodes 310, 311 or 312 will cause a current to flow therebetween.

Cathode ray tube 351 is the same as tube 301 and is provided with an electron gun 353 having a filament 354, an indirectly heated cathode 355, a control electrode (not shown) and an anode 356 for transmitting the electron beam axially down the length of the tube to the contacts 359, 360, 361 and 362 between the deflector plates 357 and 358.

Likewise, the cathode ray tube 401 (FIGURE 1E) is also provided with an electron gun 403 having a filament 404, an indirectly heated cathode 405, control electrode (not shown) and an anode 406 for transmitting a concentrated electron beam substantially axially down the length of this tube between the deflector electrodes 407 and 408 to the contact electrodes 409, 410, 411 and 412. Cathode ray tubes 451, 501 and 551 are substantially the same as cathode ray tubes 301 and 401 and are also provided with electron guns 453, 503 and 553, respectively, including heater filaments 454, 504 and 554, respectively, indirectly heated cathodes 455, 505 and 555, respectively, control electrodes (not shown), respectively, and anodes 456, 506 and 556, respectively, for transmitting electron beams substantially axially down these tubes between the deflector electrodes 457—458, 507—508 and 557—558, respectively, to the contact electrodes 459, 460, 461 and 462, contact electrodes 509, 510, 511 and 512 and contact electrodes 559, 560, 561 and 562, respectively.

The deflector electrodes 307, 357, 407, 457, 507 and 557 are connected together to one of the terminals of each of the keys 302, 402 and 502. The deflector electrodes 308, 358, 408, 458, 508 and 558 are also connected together to the positive terminal of the battery 300 which is also connected to the terminal 400a of the voltage divider 400. The negative terminal of the battery 300 is connected to the terminal 400b of this voltage divider. A plurality of taps 314, 414 and 514 connected to the contacts 313, 413 and 513, respectively, of the keys 302, 402 and 502, respectively, are also provided to the voltage divider 400 so that different potentials may be applied to the deflector electrodes 307—308, 357—358, 407—408, 457—458, 507—508 and 557—558 by closing different ones of the keys 302, 402 or 502. For example, by closing the key 302 the potential drop between the terminal 400a and 314 of the voltage divider 400 is applied between the deflectors 307—308, 357—358, 407—408, 457—458, 507—508 and 557—558 of the tubes 301, 351, 401, 451, 501 and 551, respectively, so that the beams of these cathode ray tubes are raised or deflected from their normal or rest positions beneath the contactors of these tubes to the first contact sets, namely, contacts 309—310 of tube 301, contacts 359—360 of tube 351, contacts 409—410 of tube 401, contacts 459—460 of tube 451, contacts 509—510 of the tube 501 and contacts 559—560 of tube 551. Opening the key 302 and closing the key 402 increases the potential applied to the deflectors 307—308, 357—358, 407—408, 457—458, 507—508 and 557—558 of the tubes 301, 351, 401, 451, 501 and 551, respectively, so that the electron beams of these tubes are deflected or raised to the next set of contactor electrodes, namely, 309—311, 359—361, 409—411, 459—461, 509—511 and 559—561. Likewise, closing the key 502 serves to further increase the potential applied between the deflectors 307—308, 357—358, 407—408, 457—458, 507—508 and 557—558 of the tubes 301, 351, 401, 451, 501 and 551, respectively, and the electron beams of these tubes are accordingly raised or deflected to the next sets of contactor electrodes, namely, electrodes 309—312, 359—362, 409—412, 459—462, 509—512 and 559—562, respectively. It will also be observed that the keys 302, 402 and 502 are provided with a mechanical lock or gate that locks the depressed key in set position and the depressed key is released by the setting of another of said keys.

The contactor electrodes 309, 409 and 509 are connected to the terminals 316, 416 and 516 of the switches 99, 199 and 299, respectively. The terminals 315, 415 and 515 of these switches 99, 199 and 299, respectively, are connected to the electrodes 359, 459 and 559 of the cathode ray tubes 351, 451 and 551, respectively. The terminals 317, 417 and 517 of these switches 99, 199 and 299, respectively, are connected to the terminals 315, 415 and 515, respectively. Likewise, the terminals 318, 418 and 518 are connected to the terminals 316, 416 and 516, respectively, as shown. The blade 97 of the switch 99 is connected to the anode of the amplifier tube 94. Accordingly, the blade 197 of the switch 199 is connected to the anode of the amplifier tube 194, and the blade 297 of the switch 299 is connected to the anode of the tube 294. The cathodes of the tubes 94, 194 and 294 are connected together to the negative terminal of the battery 96 and the lower terminals of the resistors 95, 195 and 295 are connected together to the blades 98, 198 and 298 of switches 99, 199 and 299, respectively, to the positive terminal of the battery 96. It will therefore be seen that the switches 99, 199 and 299 may be employed for reversing the polarities of the impulses applied to the contactor electrodes 309—359, 409—459 and 509—559 of the tubes 301—351, 401—451 and 501—551, respectively and thereby to control positive and negative registration, as will be hereinafter described in detail.

Contactor 310 of tube 301 is connected to the terminal 604 which is connected to a terminal of the beam-stepping-impulse-inserting resistor 602 of tube 601. Contactor 311 of tube 301 and contactor 410 of tube 401 are connected to terminal 704 which is connected to a terminal of the beam-stepping-impulse-inserting resistor 702 of tube 701. Contactor 312 of tube 301, contactor 411 of tube 401 and contactor 510 of tube 501 are connected to terminal 804 which is connected to a terminal of the beam-stepping-impulse-inserting resistor 802 of tube 801. Contactor 360 of tube 351 is connected to terminal 605 which is connected to another terminal of the resistor 602 of tube 601. Contactor 361 of tube 351 and contactor 460 of tube 451 are connected to terminal 705 which is connected to another terminal of resistor 702 of tube 701. Contactor 362 of tube 351, contactor 461 of tube 451 and contactor 560 of tube 551 are connected to terminal 805 which is connected to another terminal of the resistor 802 of tube 801. Contactor 412 of tube 401 and contactor 511 of tube 501 are connected to terminal 904 which is connected to a terminal of the beam-stepping-impulse-inserting resistor 902 of tube 901. Contactor 462 of tube 451 and 561 of tube 551 are connected to terminal 905 which is connected to another terminal of the resistor 902 of tube 901. Contactor 512 of tube 501 is connected to terminal 1004 which is connected to a terminal of the beam-stepping-impulse-inserting resistor 1002 of tube 1001. Contactor 562 of tube 551 is connected to terminal 1005 which is connected to another terminal of the resistor 1003 of tube 1001.

*Operation of Ordinal Position Shifting Circuit*

The operation of tubes 301, 351, 401, 451, 501 and 551 is as follows. Since the deflector electrodes 307, 357, 407, 457, 507 and 557 of the tubes 301, 351, 401, 451, 501 and 551, respectively, are connected together and the deflectors 308, 358, 408, 458, 508 and 558 of these respective tubes are also connected together, these deflector electrodes are energized in parallel from the source of potential 300, voltage divider 400 and keys 302, 402 and 502. As was previously described, one terminal of each of the keys 302, 402 and 502 is connected to the common circuit of the deflectors 307, 357, 407, 457, 507 and 557. Accordingly, closing the key 302, for example, applies a certain deflector potential on all of the deflectors of tubes 301, 351, 401, 451, 501 and 551 in parallel and operates to deflect the electron beams of these respective tubes from the rest or normal position below the electrodes 309, 359, 409, 459, 509 and 559, respectively, up to the first position of each of these tubes, namely, to the electrodes 309—310, 359—360, 409—410, 459—460, 509—510 and 559—560, respectively.

This conditioning of the electron beams of the respective ordinal switching tubes serves in effect to complete the connection of the units order selection tube 10 from the reversing switch 99 through the ordinal switching tubes 301 and 351 to the units order register tube 601 so that selected impulses generated by the selection tube 10 will be transmitted through the described circuit to the beam-stepping-impulse-inserting resistor 602 of the register tube 601 to cause registry of these impulses therein in a manner later described.

Correspondingly, the tens order selection tube 110 is connected through the reversing switch 199, the ordinal switching tubes 401 and 451 to the tens order register tube 701 so that any impulses generated by the selection tube 110 will be applied to the beam-stepping-impulse-inserting resistor 702 of the register tube 701. Similarly, the hundreds or third order selection tube 210 is connected through the reversing switch 299, the ordinal switching tubes 501 and 551 to the third or hundreds order register tube 801 so that the impulses through this circuit will be applied to the beam-stepping-impulse-inserting resistor 802 thereof.

It will be apparent from the previous description that the adjustment of the respective reversing switches 99, 199 and 299 will determine whether or not these pulses are applied in a negative or positive fashion to the beam-stepping-impulse-inserting resistors of the tubes 601, 701, 801, etc.

It it is desired to shift the ordinal relation between the selection tubes and the register tubes from the one described above which obtains with the key 302 depressed, the key 402 may be depressed to apply a different potential to the deflector electrodes of the switching tubes 301, 351, 401, 451, 501 and 551 so that the electron beams thereof are caused to impinge upon the second or middle set of electrodes, namely 309—311, 359—361, 409—411, 459—461, 509—511 and 559—561.

This conditioning of the switching tubes serves in effect to shift the ordinal relation of the selection tubes one place or one order with respect to the register tubes so that the units order selection tube 10 is connected through the reversing switch 99, the switching tubes 301 and 351 to the register tube 701, and correspondingly the selection tubes 110 and 210 are connected to the register tubes 801 and 901.

Similarly, if it is desired again to change the ordinal relation between the selection tubes and the register tubes, the key 502 may be depressed so that again a one step or place shift is effected by re-positioning of the electron beams of the ordinal switching tubes 301, 351, 401, 451, 501 and 551 to impinge upon the uppermost pairs of contacts. In this condition of the parts the units order selection tube 10 is connected to the hundreds order register tube 801. The tens order selection tube 110 is connected to the thousands order register tube 901, and the hundreds order selection tube 210 is connected to the ten-thousands order register tube 1001.

While the switching tubes 301, etc., are shown with three pairs of contacts, it will be obvious that additional pairs of contacts could be supplied in such tubes to accomplish further relative shifting between the selection tubes and the register tubes of the accumulator, the number of places of shifting being controlled in accordance with the number of selection tubes provided, the number of register tubes provided and the number of digits desired in performing multiplying and dividing operations.

*Accumulator or Register Circuit*

The accumulator or register comprising the cathode ray tubes 601, 701, 801, 901, 1001 and 1101 is adapted to receive the selected number of impulses from the related orders of the selection mechanism and accumulate the values therein in response to the number of pulses entered so as to be employed to obtain sums in addition or subtraction to display the product of a multiplication or the sums of products of successive multiplications and to serve in all particulars similar to the accumulator or total register of a calculating or adding machine of the mechanical type. The register tubes are reversible in character and are responsibe to both positive and negative pulses to perform addition and subtraction, respectively, as determined by the setting of controls of the apparatus. Also, tens transfer mechanism is provided to transfer increments or pulses from order to order, i.e., from tube to tube, of the register as the transfers occur during the calculating operation. The cathode ray tubes 601, 701, 801, 901, 1001 and 1101 are, in general, of the same type as cathode ray tube 10 in that these tubes are provided with electron guns 606, 706, 806, 906, 1006 and 1106, respectively, for producing electron beams and transmitting these beams substantially down the lengths of the respective tubes. These beams pass between the deflector electrodes of the respective tubes to complete the desired circuits at the right-hand ends of the tubes and also activate the fluorescent figures or legends associated with the contactors at the right-hand ends of the tubes. For example, the electron beam transmitted by the electron gun 606 of the tube 601 passes between the deflector plates 607 and 608, and after passing between the deflectors 607 and 608 the beam is employed to close the desired circuit associated with the contactors 609 to 618 and 619 to 628. These contactors are arranged in pairs as follows: 609—619, 610—620, 611—621, 612—622, 613—623, 614—624, 615—625, 616—626, 617—627 and 618—628, corresponding to digits from zero to nine, respectively, and these digits are outlined in fluorescent material on the inside surface 629 of the right-hand end of the tube 601. The contactors 609 to 618, inclusive, are connected together to a bus 630 which is connected to the variable resistor 631 and to the deflector plate 608. The electrodes 619 to 628, inclusive, are connected to taps 632 to 641, inclusive, respectively, of the voltage divider 642. The tap or terminal 641 of the voltage divider 642 is connected to the normally closed zeroizing or resetting key 643 and from this to the positive terminal of the battery 644, the negative of this battery being connected to the resistor 602 and through this to the deflector plate 607. Similarly, the electron beam of the tube 701 transmitted from the electron gun 706 longitudinally down the length of this tube between the deflector plates 707 and 708 is employed to close the desired circuits associated with the contactor electrodes 709 to 728. The tube 801 is likewise provided with an electron gun 806 for generating an electron beam which passes between the deflector electrodes 807 and 808 to close desired circuits associated with the contactors 809 to 828 and similar arrangements are provided in tubes 901, 1001 and 1101 so that the electron beam generated by the electron gun 906 of tube 901 passes between the main deflector electrodes 907 and 908 to close desired circuits associated with the contactors 909 to 928. The tube 1001 is provided with an electron gun 1006 which likewise generates an electron beam and projects this beam between the deflector electrodes 1007 and 1008 to close desired circuits associated with the contactors 1009 to 1028. The same procedure is obtained in tube 1101 in which the electron gun 1106 transmits an electron beam between the deflector electrodes 1107 and 1108 to close desired circuits associated with the contactors 1109 and 1128. Contactors 709 to 718, inclusive, of tube 701 are connected to bus 730, contactors 809 to 818, inclusive, of tube 801 are connected to bus 830, contactors 909 to 918, inclusive, of tube 901 are connected to bus 930, contactors 1009 to 1018, inclusive, of tube 1001 are connected to bus 1030, contactors 1109 to 1118, inclusive, of tube 1101 are connected to bus 1130, and these buses 730, 830, 930, 1030 and 1130 are connected to variable resistors 731, 831, 931, 1031 and 1131, respectively, these resistors, in turn, are connected to deflector plates 708, 808, 908, 1008 and 1108, respectively, as shown. The electrodes or contactors 719 to 728, inclusive, of tube 701 are connected to taps 732 to 741, respectively, of the voltage divider 742, contactors 819 to 828, inclusive, of tube 801 are connected to taps 832 to 841, respectively, of the voltage divider 842, contactors 919 to 928, inclusive, of tube 901 are connected to taps 932 to 941, inclusive, respectively, of the voltage divider 842, contactors 919 to 928, inclusive, of tube 901 are connected to taps 932 to 941, inclusive, respectively, of the voltage divider 942, contactors 1019 to 1028, inclusive, of tube 1001 are connected to taps 1032 to 1041 of the voltage divider 1042, and contactors 1119 to 1128, inclusive, of tube 1101 are connected to taps 1132 to 1141, inclusive, respectively, of the voltage divider 1142.

As has been pointed out previously, the original switching tubes transmit pulses to the deflector circuits of the register tubes, that is, switching tube 301 and 351 may be connected to transmit pulses to the deflectors 607—608 of the register tube 601 by passing currents corresponding to the pulses through the resistor 602, etc., and if these pulses are of such polarity that they add to the voltage of the battery 644 the first pulse functions to move the beam of the tube 601 from its starting position on electrode 609—619 to the next pair of electrodes 610—620, etc. However, if the switches 99, 199 and 299 are set in the subtract position the pulses applied to the resistors 602, 702, etc. of tubes 601, 701, etc. will subtract from the voltages of the batteries 644, 744, etc. and the beam of tube 601, for example, will be moved from the electrodes 609—619 downward to electrodes 660—661, 662—663 and will close the circuits of these pairs of electrodes either through the electron beam itself so that the beam will be quenched through electrodes 662—663 or through secondary electron emission therefrom and at the same time the voltage of the battery 644 will be maintained applied to the deflectors 607—608 because the electrodes 662—663 are coated with an emitting material such as thorium oxide which persists in electron emission an instant after the tube beam is shut off therefrom, long enough to keep the battery 644 voltage applied to the deflectors 607—608 to deflect the re-established beam to the electrodes 618—628, i.e., the "9" position. The next negative pulse applied to the resistor 602 catches the beam on the electrodes 618—628, i.e, the "9" position, and moves it down to the electrodes 617—627 corresponding to the "8" position, etc. The tubes 701, 801, 901 and 1001 are arranged to receive positive and negative pulses in the same manner as the tube 601.

The deflector electrodes 607—608, 707—708, 807—808, 907—908, 1007—1008 and 1107—1108 may be provided with shunting resistors 645, 745, 845, 945, 1045 and 1145, respectively, if desired, for the purpose of providing a continuous circuit across these respective deflector electrodes, and in each of these cases these resistors may be of the order of a megohm or more depending upon the parameters of these tubes.

Suitable variable filter circuits 604a, 704a, 804a, 904a and 1004a of a type adapted to selectively pass only a selected frequency or frequencies may be connected to the terminals 604—605, 704—705, 804—805, 904—905 and 1004—1005, respectively. These filters may consist of impedance networks adapted to pass only certain pulse rates per second from the selection tubes 10, 110 and 210 and different rates may be set into the different filters, if desired, by varying the values of one or more of the impedances in these filter networks. For example the networks 604a, 704a and 804a may each have characteristics to render these networks responsive to certain pulse rates per second when these networks are connected to receive pulses from tubes 10, 110 and 210, respectively. However, when these tubes are switched through the switching tubes to feed pulses to terminals 704—705, 804—805 and 904—905, respectively, then the filter network 704a is adjusted to the pulse rate of tube 10, filter 804a is adjusted to the pulse rate of tube 110 and filter 904a is adjusted to the pulse rate of tube 210. This adjustment may be accomplished by mechanically coupling these filter networks to the switches 302, 402 and 502, and in this way the filters receiving pulses from the different selection tubes may be adjusted to the pulse rates of those selection tubes.

While these filter circuits are not essential to the operation of this apparatus, they are desirable in insuring against interfering pulses and transients. These may be eliminated in other ways should they develop, for example, by proper shielding of the tubes and connections and grounding the shields.

*Tens Transfer Circuit*

Each of these tubes 601, 701, 801, 901, 1001 and 1101 is also provided with two sets of electrodes, such as electrodes 662—663 and 664—665 of tube 601, designated as beam extinguishing and tens transfer electrodes. These tens transfer electrodes are utilized to sense the passing of the numeral mechanism from "0" to "9" and "9" to "0," respectively, and to cause the entry of a transferred increment or pulse into the next higher order accumulator or register tube, as will now be described.

These electrodes positioned in each of these tubes are connected in parallel, that is, electrode 662 is connected to electrode 664 and electrode 663 is connected to electrode 665, and, in turn, electrodes 662—664 are connected to a terminal of the resistor 754 and coupled through a suitable transformer 666a to the extinguishing electrode 666. Electrodes 663—665 are connected to a terminal of the resistor 752 and to the grid of tube 749. The voltage divider 750 is connected in series with the vacuum tube 749 across the battery 774 in such manner that the anode of the tube 749 is connected to the positive terminal of the battery 774 and to the other terminal of the aforesaid resistor 754. The other terminal of the aforesaid resistor 752 is connected to the negative terminal of the battery 774. The grid electrode of the tube 749 is connected to a high resistance 752 and through this to the negative terminal of the resistor 750 and the cathode of this tube is connected to the positive end of this resistor 750 so that an infinitesimal current normally flows through the resistor 750 and the tube 749 because of the high negative bias applied to the grid of this tube. The electrodes 662—664 and 663—665 are connected between the resistors 752 and 754, and when the circuit between these electrodes is completed by the electron beam of the tube 601 the grid bias of the tube 749 is changed sufficiently to cause this tube to conduct a current pulse through the resistor 750. Since the primary of the transformer 666a is connected across the battery 744 through a portion of the resistor 750 and through the resistor 754 a current normally flows through this primary. When the tube 749 is rendered more conductive through the closing of the circuit between the electrodes 662—663 or 664—665 by the electron beam the current flow through the primary of transformer 666a is reduced momentarily and a voltage pulse is induced into the secondary of the transformer. This induced pulse is applied between the anode 606 and the electrode 666 sufficient to momentarily extinguish or de-focus the beam of the tube 601. At the same time the potential drop between the negative terminal of the resistor 750 and the tap 753 of this resistor is applied in the form of a pulse to the supplementary deflectors 746—747 of the cathode ray tube 701 through the reversing switch 748. This pulse is sufficient to deflect the beam of the tube 701 one step for tens transfer purposes. Likewise, if the beam of the tube 601 closes the circuit of the electrode 662—663 at the bottom of the tube during reception of negative selection pulses, the same result will be produced with the additional result produced through the closing of the circuit of electrodes 660 and 661 which are positioned in front of, in the back of, or close to the electrode 662—663 so that the circuit thereof is closed at the same time. The electrode 660 is connected to the bus 630 and the electrode 661 is connected to the electrode 628. When the circuit between the electrodes 660 and 661 is closed, it must remain closed until the beam, which has been extinguished through the action of the electrodes 662 and 663, is re-established since upon re-establishing the beam it is desired to have it deflected to impinge upon the electrodes 618—628 and in order to accomplish this the deflection potential supplied to the electrodes 607 and 608 must be the full potential of the battery 604. This delay is accomplished by coating the electrodes 660—661 with a fluorescent and phosphorescent material of the correct time of decay so that the circuit between these electrodes will be kept closed during the decay time after bombardment by the beam. The timing to cause re-establishment of the electron beam on the contacts 618—628, that is, the "9" position of the beam must be such as to occur in the time interval between pulses of the associated selection tube 10, and this may be adjusted by the choke or R-C element 75a, or by the decay time of the phosphor coating applied to electrodes 660—661, so that as a transfer occurs during the entry of a series of selection pulses the electron beam will be re-established in the "9" position in ample time to receive the next pulse which will change its position to the contacts 617—627, that is, the "8" position of the beam. Correspondingly, when the beam is shifted from the electrodes 618—628 during positive registration and is blanked out or defocused by the circuit including the electrodes 664—665, it must be re-established in its rest position upon the contacts 609—619 in time to receive and respond to a subsequent positive pulse.

The circuit of the tube 749 includes a plurality of resistors in addition to the voltage divider resistor 750, which is connected in series with the tube 749 across the battery 744 and these additional resistors 752 and 754 are connected across the battery 744 in series with the electrodes 664 and 665, so that when the circuit between the electrodes 664 and 665 is closed by means of the electron beam of the tube 601, the voltage divider, consisting of the resistors 752 and 754, is connected across the battery 744 and a current flows therethrough. The terminal of the resistor 752 which is connected to the electrode 665 is also connected to the grid of the tube 749 and the terminal of the resistor 754 connected to the electrode 664 is also coupled through the transformer 666a to the de-focusing electrode 666. Consequently, when the circuit through the resistors 752 and 754 is completed through either electrodes 664—665 or 662—663, the potential of the grid of the tube 749 is changed and this tube is rendered conductive so that a current flows through the resistor 750, thereby applying a potential pulse to the defocusing electrode 66, making this electrode negative with respect to the anode 606, and also, as previously explained, applying an impulse upon the auxiliary deflectors 746 and 747 of the tube 701 through the reversing switch 748. The purpose of the reversing switch 748 is to reverse the polarity of the impulse applied to the electrodes 746—747 so that the impulse applied to these electrodes may be used to move the cathode ray beam of the tube 701 either up or down in accordance with whether or not the machine is adjusted for addition or subtraction.

Transformers 666a, 766a, 866a, 966a and 1066a are connected between electrodes 606—666, 706—766, 806—866, 906—966 and 1006—1066 of register tubes 601, 701, 801, 901 and 1001, respectively, and these transformers are employed for applying suitable quenching or de-focusing pulses between the aforesaid electrodes. For this purpose the secondaries of these transformers may be connected between electrodes other than those shown in the drawing, as for example between the control electrodes (not shown) and the terminals of the respective batteries connected to the aforesaid control electrodes or between the aforesaid control electrodes and the cathodes 603, 703, 803, 903 and 1003, respectively, in place of the respective control electrode batteries. These transformers function as isolating transformers between the electron guns of the respective tubes 601, 701, 801, 901 and 1001 and the circuits of the deflector batteries 744, 844, 944, 1044 and 1144, and for improved performance in this respect grounded electrostatic shields may be positioned between the primaries and secondaries of these respective transformers. Furthermore, if desired, these transformers may be designed to have practically negligible time constants so that little or no delay is introduced into the pulse applied to the primary and that induced into the secondary.

The resistor 752 is preferably made variable and the contact 751 is also made variable so that the polarity or magnitude of the potential pulse applied between the electrodes 606 and 666 in the de-focusing operation may be changed or controlled. However, once this is properly determined, these adjustable resistors may be fixed.

A tube 849 corresponding to the tube 749 is connected between the cathode ray tube 701 and 801 in the same manner as the tube 749 is connected between the cathode ray tubes 601 and 701. This tube 849 is also connected in series with voltage dividing resistor 850 across the battery 844 so that a current flows through the resissor 850 when the tube 849 is rendered conductive through the closing of the circuit of the electrodes 764—765 or electrodes 762—763 by the cathode ray beam of the tube 701. When either of these latter electrodes are closed, the beam of the cathode ray tube 701 is defocused through the application of a suitable potential pulse between the electrodes 706 and 766 through the isolating transformer 766a, and also a pulse is applied to the auxiliary deflector electrodes 846 and 847 of the tube 801 for the purpose of shifting the cathode ray beam of this tube either upward or downward one step, depending upon whether or not this apparatus is connected to add or subtract, and for this purpose the polarity control switch or reversing switch 848 is provided.

Additional tubes 949, 1049 and 1149 connected in the same manner as tubes 749 and 849 are provided between the tubes 801 and 901, between tubes 901 and 1001, and between tubes 1001 and 1101, respectively, and these tubes 749, 849, 949, 1049 and 1149 may be designated as tens transfer tubes. Since the connections for these tubes are similar and the elements of the circuits thereof are designated by similar reference numerals in their respective series, the detailed circuits thereof will not be described except in so far as they are set forth in the drawings, with the exception that the auxiliary pulses are the only pulses received by the register tube 1101 as this is an extra capacity numeral or register tube and does not receive digitation pulses since the circuit to the terminals 1104 and 1105 is inactive.

It will be noted that a tens transfer pulse from one of the tubes 649, 749, 849 or 949, as described above, may be applied to the auxiliary deflectors 746—747, for example, of the next higher order register tube while this tube is receiving digitation pulses from the associated selection tube so that a simultaneous double stepping of the beam of this cathode ray tube will occur. However, when the magnets 91, 191, etc., are mounted in staggered relation on the shaft 89 so that the initiating or firing pulses are supplied successively from the lower through the higher order selection tubes, a transfer pulse from one order register tube will have completed its entry of a count in the next higher order tube before digitation pulses are entered into such higher order tube.

The cathode heating filaments of all of the tubes 601, 701, 801, 901, 1001 and 1101 are shown connected to individual secondary windings and it is, of course, obvious that these individual secondary windings may be wound upon the same core and energized from a common primary winding.

FIGURE 2 Modification

While the voltage dividers 742, 842, 942, 1042 and 1142 are illustrated as connected in series with the batteries 644, 744, 844, 944, 1044 and 1144, respectively, it is obvious that an arrangement, such as shown in FIGURE 2, wherein the voltage divider resistor is connected across the battery may be employed, and this form of deflector circuit will be described employing the same reference numerals for the deflector electrodes as those employed in the cathode ray tube 601 so that it will be obvious that this circuit may be used in place of the series circuit shown in the complete wiring diagram. In this deflector circuit the resistor 642 is connected across the battery 644 and the taps 632 to 641, inclusive, of the resistor 642 are connected to the electrodes 619 to 628, inclusive, respectively, the same as shown in the complete wiring diagram. The electrodes 609 to 618, inclusive, respectively, are connected to the deflector electrode 608 through the variable resistor 631. The negative terminal of the battery 644 is again connected to the deflector electrode 607 through the resistor 602, however, in this case the terminal 632 of the voltage divider 642 is also connected directly to the electrode 607 through the resistor 602. Furthermore, reset key 643 is in this case connected between the battery 644 and a resistor 642.

In this form of the deflector circuit the battery 644 feeds a current through the voltage divider resistor 642 continuously, and different voltages from zero to full voltage of the battery 644, corresponding to the taps 632 to 641, are applied to the deflector electrodes 607 and 608 as the beam of the tube 601 is swept over the electrodes 609 to 628. Quenching or tens transfer electrodes 662—663 and 664—665 connected the same as in the complete wiring diagram are also employed in this deflector circuit. Likewise, electrodes 660 and 661 are connected in parallel with electrodes 618 and 628.

Register Tube Construction

FIGURE 3 is a detail vertical sectional view of the electrode and viewing end of a modified form of one of the accumulator or register tubes, such as tubes 601, 701, 801, etc. The tube 601a shown in FIGURE 3 is provided with an extension 601b provided with a series of lens systems 1300 to 1309, inclusive, positioned to focus the fluorescent legends 1310 to 1319, inclusive, respectively, upon the viewing screen 1320. The fluorescent legends 1310 to 1319, inclusive, are shown in the front elevation view of FIGURE 4, and these legends are coatings of fluorescent material corresponding to the coating 629 of tube 601 and these coatings are positioned on the inside wall of the tube 601a or upon suitable surfaces attached to the electrode supports, as will be presently described. The legends 1310 to 1319, inclusive, may themselves be made of fluorescent material or the outlines surrounding the legends may be made of fluorescent material, and in any event the numeral to be exhibited would be shown either in fluorescent outline or surrounded and/or backed by fluorescent material. The composition of these fluorescent materials is well known in the art relating to cathode ray tubes as well as other arts, and it is of course desirable to use different materials, such as the fluorescent minerals, willemite, scheelite, sphalerite, etc., or artificially prepared fluorescent materials both individually or mixed as may be desired. Furthermore, the fluorescent material may consist of mixtures, the components of which are adapted to fluoresce selectively with different beam intensities of the cathode ray beam.

The fluorescent legends 1310 to 1319, inclusive, may be applied to the inside surface of the end of the cathode ray tube 601a or they may be applied to surfaces, such as a mica strip supported by the electrode support 1321, which consists of a pair of parallel rods 1322 and 1323 made of glass, "Mycalex," fused quartz, porcelain, synthetic porcelain and the like, and this pair of parallel rods 1322 and 1323 are held in spaced apart relation by two or more cross members 1324 also of one of the insulation materials listed and fused to the members 1322 and 1323. The ends of the members 1322 and 1323 form short studs which fit into small springs 1325. These small springs 1325 also fit over short studs 1326 fused to the inside of the tube 601a to hold the electrode support 1321 in the desired position inside of the tube 601a and to permit a certain amount of expansion and contraction of this electrode structure. The electrodes carried by the insulating members 1322 and 1323 are positioned in pairs in individual pockets with the exception of electrodes 660a, 661a, 662a and 663a, all four of which are positioned in one compartment at the lower end of the electrode structure. The partitions between the electrodes forming the compartments may be made of mica or "Mycalex" or other insulation material, and in case "Mycalex," which is a substance consisting of mica flakes and glass ground and fused together, is used, then the partitions and the side members 1322 and 1323 may be fused or molded together or cut or sawed out of the same piece of material. The whole electrode structure consisting of the upright members 1322 and 1323 and the partitions 1327 may be molded of "Mycalex" in a suitable mold and the electrodes may be inserted into the mold at the same time so that the whole electrode structure is formed at once. It is of course obvious that the electrode support 1321, if molded of glass or "Mycalex" or like material as a unitary structure together with the partitions 1327, may be provided with suitable holes or apertures for receiving the electrodes and the electrodes inserted and fused therein afterwards. In any case, after the electrodes are assembled into the electrode support, the ends thereof inside of the small compartments may be coated with electron emitting material, such as thorium oxide, which will emit electrons when the ends of the electrodes are bombarded by the cathode ray beam. However, this coating is not essential since the cathode ray beam is itself a concentration of electrons which effectively closes the circuit between the bombarded electrodes, and if the electrodes are not coated with electron emitting material then the circuit therebetween will still be closed by the electron concentration of the beam. The portion of the beam passing the electrodes bombards the fluorescent material of the legends 1310 to 1319, inclusive, selectively as desired, and the desired legend is caused to fluoresce and thereby become luminous. As a result, the outline of the desired legend is focused upon the viewing surface 1320 by the corresponding lens system 1300 to 1309, inclusive, associated with the legends 1310 to 1319, inclusive, respectively. It will be observed that the legends 1310 to 1319, inclusive, are supported adjacent to certain ones of the electrodes of the electrode structure 1321, and it will be further observed that the electrodes 660a, 661a, 662a and 663a in the lowermost electrode compartment and electrodes 664a and 665a in the uppermost compartment are not associated with any fluorescent legend since these are tens transfer electrodes.

In order to support the mica strip carrying the legends 1310 to 1319, inclusive, in the proper alignment and spacial relation with respect to the corresponding electrodes, this mica strip may be strapped to the electrode structure 1321 by two or more small wires 1328 which encircle both the mica strip and the electrode structure 1321 at appropriately spaced positions.

The connection of the electrodes shown in FIGURES 3 and 5 is the same as the connection thereof in the tubes 601, 701, 801, etc., and for these details reference is made to the figures in which these tubes and the connections thereof are illustrated.

In FIGURE 5A is illustrated a modified form of electrode construction resembling a comb construction in which each of the electrodes, instead of consisting of a single ball-shaped member, consists of a plurality of short parallel wire-shaped members. The advantage of this construction is that the electron beam passing through the electrodes to the fluorescent legends is not distorted so that it bombards the fluorescent legend more uniformly over the entire legend surface, thereby causing more uniform fluorescence of the entire legend and at the same time functions to close the circuit between the desired electrodes efficiently. The electrode suports in this form are substantially the same as in the form shown in FIGURE 5, in that this structure may be made in the form of small compartments out of material, such as glass or "Mycalex," and the terminals of the electrodes are also positioned in small compartments formed between partitions 1327 and the side members 1322 and 1323. In each case, however, the electrodes, instead of consisting of a single ball-shaped terminal, consist of four or five or more small wire-like members which are either opposing each other, parallel to each other, in front of or in back of each other or both, or interlaced with each other, in groups in separate compartments, as illustrated, and these wire-like members may be coated with electron emitting material that emits electrons when bombarded by the beam.

All of the electrodes on one side of the electrode structure, with the exception of the electrodes 662a to 664a, are connected together, and these electrodes, since they are connected together, may be made as a unitary structure integral with the side 1322 of the electrode structure 1321 and in that case the side 1322 of the electrode structure is made of a conducting material, such as nickel, and the wire-like electrodes, projecting into the small compartments, are attached thereto, for example, by spot welding. The side 1323 is, in this case, made of "Mycalex" integral with the partitions 1327, and this side 1323 is attached to the conductive side member 1322 by means of two or more wire-shaped members 1329 which may be spot welded to the member 1322 or formed integral therewith and which are fused or otherwise attached to the member 1323. In the case just described where the member 1322 is made of conducting material, the electrodes 662a and 664a supported thereby must be insulated therefrom and this may be accomplished by a suitable insulating sleeve supported by the member 1322 and surrounding the leads of the electrodes 662a and 664a, respectively, as shown in FIGURE 5B.

It is obvious that the detailed construction of the register tube described above is generally applicable to the construction of the selection and switching tubes as well.

Revolutions or Items Counter

A separate circuit is employed for counting the revolutions of the shaft 89 and this circuit is fed impulses from the pickup coil 386 associated with the rotary magnet 391. For this purpose two ordinal shifting tubes 392 and 393 of the same type as tubes 301, 351, 401, 451, 501 and 551 are employed as input tubes. Pulses from the pickup coil 386 are applied to the electrodes 394 and 395 of the tubes 392 and 393, respectively, through the reversing switch 396. The beam deflector electrodes 420—421 of tube 392 and beam deflector electrodes 422—423 of tube 393 are connected in parallel with the deflectors of the tubes 301, 351, 401, 451, 501 and 551 so that the cathode ray beams supplied by the electron guns 424 and 425 of the tubes 392 and 393, respectively, are deflected by the potentials applied thereto through the manually settable keys 302, 402 and 502 in step with the cathode ray beams of the tubes 301, 351, 401, 451, 501 and 551.

It will be noted that three switching electrodes 426, 427 and 428 associated with the electrode 394 and positioned in substantially circular apertures of this latter electrode are provided in the switching tube 392, and likewise three electrodes 429, 430 and 431 associated with substantially circular apertures in the electrode 395 are provided in the switching tube 393, the same as switching electrodes of tubes 301, 351, 401, 451, 501 and 551 and corresponding electrodes of all of these tubes are closed by the respective cathode ray beams thereof simultaneously since all of the beams of these tubes are simultaneously deflected to close corresponding switching electrodes thereof.

The switching electrodes 426 and 429 are connected to terminals 432 and 433, respectively, of the units order 434 of the revolutions counter, the switching electrodes 427 and 430 are connected to the terminals 435 and 436, respectively, of the tens order 437 of the revolutions counter, and the switching electrodes 428 and 431 are connected to the terminals 438 and 439, respectively, of the hundreds order 440 of the revolutions counter. The input terminals 441 and 442 of the thousands order 443 of the revolutions counter are left inactive since this thousands order of the revolutions counter receives its control pulses in the form of tens transfer from the hundreds order counter 440, as will be presently described. The units order counter 434 consists of the same apparatus as the units order of the accumulator employing the tube 601 and associated apparatus. This units order counter 434 is connected to the tens order counter 437 through a tens transfer circuit 444 and this circuit employs a transfer tube, such as tube 749 associated with the tubes 601 and 701, together with its associated components.

Likewise, the tens order counter 437 is an apparatus similar to the tens order register 701, and this is connected to the hundreds order counter through a transfer apparatus 445 corresponding to the tens transfer apparatus employing tube 849. The hundreds order counter 440 is connected to the thousands order counter 443 through a transfer circuit 446 corresponding to the tens transfer circuit employing the tube 949.

From the above description it will be apparent that the revolutions counter circuit, including the component circuits 434, 444, 437, 445, 440, 446 and 443 will operate to register the number of cycles of operation in entering items into the accumulator. The sign character of the items entered in the accumulator may be similar to, or the opposite of, the sign character of the counts entered in the revolutions counter so that either the multiplier or quotient, or the complements thereof, may be selectively entered by appropriate setting of the reversing switch 396 which is independently adjustable, whereas the reversing switches 99, 199, etc., together with the reversing switches 748, 848, etc., are operated as a gang and always have a similar setting.

FIGURE 6 Modification

FIGURE 6 shows a modification of the invention including a modified triggering circuit for the selection tubes and showing the selection tubes coupled directly to the aligned orders of the register tubes, as will be described in greater detail.

This circuit employs an electric discharge tube 1400 of the three-electrode gaseous type having a cathode, a grid and an anode. The grid of the tube 1400 is connected to the cathode of the light sensitive tube 1401 and to the grid resistor 1402. The anode of the light sensitive tube 1401 is connected to the tap 1403 of the voltage divider 1404 which is connected across the battery 1405 through the switch or key 1406. The grid resistor 1402 is, in turn, connected to the negative terminal of the voltage divider 1404 and the cathode of the tube 1400 is connected to an intermediate point 1407 of the voltage divider. The positive terminal of the voltage divider is connected to the common terminal of the resistors 1408, 1409 and 1410, and this common terminal is connected to the deflectors 83, 183 and 283 of the selection tubes 10, 110 and 210, respectively. The upper terminals of the resistors 1408, 1409 and 1410 are connected to condensers 1411, 1412 and 1413, respectively, and the upper terminals of these condensers are connected to the anode of the tube 1400, the condenser 1411 being connected to this anode direct, condenser 1412 being connected thereto through a resistance 1414 and the condenser 1413 being connected thereto through a resistance 1415. A connection between the resistor 1408 and the condenser 1411 is connected to the deflector 84 of selection tube 10 through the switch 1416, the connection between the resistor 1409 and the condenser 1412 is connected to the deflector 184 of selection tube 110 through the switch 1417, and the connection between the resistor 1410 and the condenser 1413 is connected to the deflector 284 of selection tube 210 through the switch 1418. These switches 1416, 1417 and 1418 are mechanically coupled to the keyboard of the calculator so that the circuit between each order of the selection tube is connected or enabled with respect to the aligned order register tube only when a value key of the aligned order is depressed. In other words, when one of the row of keys 36 to 44 of the units order selection mechanism is depressed, the switch 1416 is closed. When one of the keys 136 to 144 of the tens order is depressed, the switch 1417 is closed and correspondingly the switch 1418 is closed only when one of the value keys 236 to 244 is depressed. A suitable form of mechanical coupling is described hereinafter.

As previously explained, the orders of the selection mechanism, including the selection tubes 10, 110 and 210, are connected through the reversing switches 99, 199 and 299, respectively, to the aligned orders of the register tubes indicated schematically at 601, 701 and 801, respectively. Thus, the three lowest orders of the register tubes are adapted to receive digitation pulses from the selection mechanism, and the higher order register tubes 901, 1001 and 1101 do not receive digitation pulses as they are not connected to any orders of the selection mechanism. The tens transfer circuits, including the tubes 749, 849, 949, 1049 and 1149, are similar in all respects to those previously described and are similarly connected between the associated pairs of register tubes 601—701, 701—801, 801—901, 901—1001 and 1001—1101.

Due to the extreme rapidity of operation of this type of electronic selection and registering mechanism, the elapsed time interval of solving a problem in multiplication or division by repeated cycles of operation is extremely short. This time interval may be measured in terms of seconds and can be varied by varying the time constants of certain elements, such as the devices 75a, 175a and 275a, associated with the selection tubes 10, 110 and 210, respectively, and by introducing different values of voltage and resistors associated with the beam deflection circuits of the various tubes 601, 701, 801, 901, 1001 and 1101, as well as controlling the time constants of the delay circuits associated with the triggering tube 1400.

Operation of the Modified Circuit of FIGURE 6

The circuit shown in FIGURE 6 was designed, among other things, to provide staggered or successive operation of the selection tubes 10, 110 and 210, and after selected values are set into the keyboard and the switches 1416, 1417 and 1418 are closed, the switch 1406 and the switch 1419 are also closed so that lamp 1420 energizes the light sensitive cell 1401 which applies a triggering bias to the gas tube 1400 from the tap 1403 of the voltage divider 1404. In the diagram the tap 1403 is shown connected to the voltage divider 1404 on the positive side of the cathode tap 1407. However, it is obvious that this tap 1403 may be connected on the negative side of the cathode tap 1407 and the position of this grid tap 1403 will be determined by the characteristics of the tube 1400. By energizing the light sensitive cell 1401 from the light source 1420, the gas tube 1400 is fired and rendered conductive and thereupon the condenser 1411 is charged through the tube 1400. Charging the condenser 1411 causes a current impulse to pass through the resistor 1408 and this applies an initiating impulse upon the deflectors 83—84 of the selection tube 10 so that this selection tube is set into operation and caused to generate electrical impulses which are transmitted through the reversing switch 99 to the register tube 601. A short time after the condenser 1411 is charged, and preferably after operation of the tube 601 is completed, charging of the condenser 1412 takes place through the resistors 1409 and 1414. The potential across condenser 1411 is built up by the charge thereof and current then flows through the resistors 1409 and 1414 to charge the condenser 1412. Charging the condenser 1412 applies an initiating pulse on the selection tube 110 through the switch 1417 and starts this tube in operation a short time after the operation of the preceding selection tube 10. Charging the condenser 1412 permits a potential to be applied to the condenser 1413 through the resistors 1410, 1415 and 1414 so that charging current flows through this latter condenser and applies an initiating pulse to the selection tube 210 through the switch 1418. The condensers 1411, 1412 and 1413 may be designed to dissipate their own charges through their dielectrics, or they may be discharged through a suitable resistance which may be shunted across these condensers through one or more switches 1406a which are closed momentarily upon initial movement of the switch 1406 toward closed position, and which are open when switch 1406 is closed.

Multiple Cycle Control

A modified form of impulse generating electronic apparatus is illustrated in FIGURE 7 which provides selective multiple cycles of operation. In this apparatus a gas type of triode 1421 similar to the triode 1400 is employed for charging condensers 1422, 1423, 1424, 1425, 1426, 1427, 1428, 1429 and 1430, corresponding to the numerals one to nine, inclusive. These condensers 1422 to 1430 are connected to the anode of the tube 1421 through keys or switches 1432 to 1440, inclusive, respectively, and these switches are arranged so that they are closed from left to right, that is, switch 1432 will be closed first and closing this switch will produce one impulse in the circuit connected between the terminals 1441 and 1442 which are connected across the resistance 1443. However, closing switch 1433 functions to close switch 1432 also so that two impulses are produced between the terminals 1441 and 1442, corresponding to the charges of condensers 1422 and 1423. Likewise, closing switch 1434 produces three impulses, switch 1435 produces four impulses, switch 1436 produces five impulses, switch 1437 produces six impulses, switch 1438 produces seven impulses, switch 1439 produces eight impulses and switch 1440 produces nine impulses. By way of example, terminals 1441 and 1442 are connected to the grid and cathode of the tube 1400, the output circuit of which is connected to control the selection tubes 10, 110 and 210, as shown and described in FIGURE 6. In this way the tube 1421 and associated switches 1432 to 1440, inclusive, may be manipulated to control selective multiple cycle operation of the whole apparatus shown in FIGURE 6.

It will be observed that the condensers 1422 to 1430, inclusive, are connected to different taps on the resistor 1443. However, all of the condensers may be connected to the same tap of this resistor if desired. It will be further observed that the switch 1432 is connected direct to the anode of the tube 1421, the switch 1433 is connected through a resistor 1444, the switch 1434 is connected through resistors 1444 and 1445, the switch 1435 is connected through an additional resistor 1446, the switch 1436 is connected through an additional resistor 1447, the switch 1437 is connected through an additional resistor 1448, the switch 1438 is connected through an additional resistor 1449, the switch 1439 is connected through an additional resistor 1450 and the switch 1440 is connected through an additional resistor 1451. These resistors 1444 to 1451, inclusive, control, together with the condensers, the timing in the charging of the condensers, and it will be observed that these resistors 1444 to 1451, as well as the resistors 1414 and 1415 of FIGURE 6, may be in the form of suitable choke coils.

It is apparent that when the tube 1421 is fired the voltage drop across the resistor 1443 applies a positive voltage between the grid and cathode of the discharge tube 1400; under these conditions the grid of the tube 1400 will draw current from the aforesaid resistor and in order to limit this current resistor 1400a is connected between the aforesaid resistor 1443 and the grid of the tube 1400.

The timing of the apparatus shown in FIGURE 7 may be easily controlled by designing the tube 1421, which conducts the charging current for the condensers 1422 to 1430, inclusive, substantially in succession, to operate at its maximum current carrying capacity while charging each condenser and from the current carrying capacity of this tube the size of the respective condensers 1422 to 1430 may be determined. If it is desired to prolong the charging of each of these condensers, the tube 1421 may be of a relatively high vacuum type instead of a gas type and may be designed or biased to carry maximum currents of the order of a milliampere or even less so that an appreciable length of time measured in fractions of a second may be required to charge each of the condensers 1422 to 1430 in succession. If a gas tube is used as the tube 1421, this gas tube will, of course, be de-ionized after the connected condensers 1422 to 1430 are charged so that no difficulty is encountered in quenching such a gas tube. In the case of the tube 1400 shown in FIGURE 7, this tube may likewise be either a gas tube or a high vacuum tube and may also be designed for various current carrying capacities so that the tube itself may function as a time delay element in the charging of the condensers 1411, 1412 and 1413, if desired. It is, of course, preferred to obtain the highest speed operation possible consistent with proper sequence of operation of the various circuits. It will be observed that no condenser discharging key is shown connected across the condensers 1411, 1412 and 1413, inasmuch as previously stated, this discharge may be obtained through the dielectric of the condensers themselves, particularly if the condensers are of the electrolytic type.

Operation of Circuit of FIGURE 7

When the switch 1452 is closed, a positive potential is applied to the grid of the tube 1421 with respect to the cathode and the tube is fired in case this tube is a gas discharge tube or the impedance of the tube is substantially reduced in case it is of the high vacuum type. It is of course apparent that the grid of the tube 1421 does not necessarily have to be at a positive potential with respect to the cathode for the gas discharge tube to be fired, since the grid may be at the cathode potential or even negative with respect to the cathode for the tube to be fired, and likewise high vacuum tubes may have their impedance altered sufficiently simply by reducing the negative bias of the grid thereof, depending upon the characteristics of the tube and the anode voltages used. Therefore, closing the switch 1452 initiates the operation of the tube 1421 by suitably altering the grid potential of this tube thereby charging of the condensers 1422 to 1430, inclusive, connected to the anode of the tube 1421 through the switches 1432 to 1440, inclusive, respectively. Any number of these switches may be closed depending on the number of pulses it is desired to apply to the terminals 1441 and 1442 which are connected to the grid and cathode, respectively, of the tube 1400. For example, if switch 1432 is closed, one pulse is applied to the input of the tube 1400; if both switches 1432 and 1433 are closed, two pulses are applied to the input of the tube 1400; if three switches 1432, 1433 and 1434 are closed, three pulses are applied to the input of the tube 1400, and so on, so that when all switches 1432 to 1440, inclusive, are closed nine pulses are applied to the input of the tube 1400. These pulses must be spaced sufficiently so that for each pulse applied to the tube 1400 this tube has sufficient time to charge condensers 1411, 1412 and 1413. However, this may be accomplished by adjusting the time constants or R-C constants of the charging circuits of these various condensers as well as the capacities of the condensers themselves.

Inasmuch as the grid of tube 1400 is positive with respect to the cathode when the condensers 1422 to 1430 or any one of them are charging, a resistor 1400a is provided between the grid of tube 1400 and the terminal 1441 to limit the grid current of tube 1400.

Automatic Successive Selection Triggering

The circuit illustrated in FIGURE 8 is designed to provide successive triggering of the selection tubes in succession from the lower to the higher orders after an initial triggering pulse is applied to the lowest order selection tube 10. The circuit also includes means for automatically re-cycling of the successive triggering pulses so that any selected number of cycles of operation of the calculating apparatus can be performed.

Referring to the drawing, the selection tube 10 is shown having its auxiliary deflecting paltes 83—84 connected through a battery 1460 and a manually operable control key 1461. Depression of the control key 1461 will apply a deflecting impulse to the auxiliary deflecting plates 83—84 to raise the cathrode ray of the tube 10 from its rest position 85 to impinge upon a pair of triggering electrodes 1462 and 1463 connected to the primary of a transformer 1464 through a battery 1465 so that a pulse will be applied to the primary of transformer 1464 after application of the initial triggering pulse to the tube 10.

Immediately above the electrodes 1462 and 1463 are a pair of electrodes 1466 and 1467 which are similar to the pair of quenching electrodes 18—27 and are similarly controlled by a zero key 1468 so that when the beam closes the contacts 1466—1467, a quenching or defocusing potential is applied to the quenching electrode 16, as previously described in connection with the quenching contacts or electrodes 18—27.

It will be noted that when the pulse is applied to the primary of the transformer 1464 a corresponding pulse will be induced in the secondary of this transformer and will be applied to the auxiliary deflector plates 183—184 of the "tens" order selection tube 110 to provide a triggering pulse for this tube. Thus, the electron beam of the tube 110 will be raised from its rest position 185 to impinge upon the triggering electrodes 1472 and 1473 of the tube 110 which are connected in series with the secondary of a transformer 1474 through a battery 1475. Immediately above the electrodes 1472—1473, the tube 110 is provided with a pair of quenching contacts or electrodes 1476—1477 connected in the circuit of the selection tube 110 in the same manner as the electrodes 1466—1467 in tube 10. A zero key 1478 is associated with the electrodes 1466—1467 to control the quenching circuit from the electrodes 1476—1477 to the quenching electrode 116.

When a pulse is produced in the primary of the transformer 1474, a triggering pulse is induced in the secondary of this transformer and is applied to the auxiliary deflector plates 283—284 of the third or "hundreds" order of the selection tube 210 so that its electron beam will be raised from the rest position 285 to operate in conjunction with the triggering electrodes 1482—1483 and the quenching electrodes 1486—1487, in the manner previously described, the quenching electrodes becoming effective if the zero key 1488 is in switch closing position.

In connection with the operation of the successive triggering pulses, the zero key 1468, 1478 or 1488 of any order tube is closed only when no value key in this order of the keyboard is depressed. In this way the triggering pulse will be transmitted by a particular order of the selection mechanism even though this particular order of the selection mechanism is otherwise idle during a cycle of operation, and the cathode ray beam thereof will be immediately quenched before it is raised sufficiently to produce a digestion pulse. When no "zero" key is employed the switch control of quenching of the beam may be effected by providing a normally closed switch between the contact electrodes 1466—1467, for example, and quenching electrode 16, this normally closed switch being opened when any of the value keys 36 to 44 of the order are depressed.

Preferably, the transformers 1464, 1474 and 1484 are provided with a sufficient time delay so that, for example, the operation of the units order selection tube 10 and its aligned order of the register mechanism will be completed and any tens transfer operation performed before the triggering pulse is applied to the auxiliary deflector plates 183—184 of the tube 110 to start the digitation operation in this second order selection tube and in order to control this time delay, variable condensers 1464a, 1474a and 1484a may be connected across these transformers 1464, 1474 and 1484, respectively.

In order to provide any selected number of successive cycles of operation of the selection mechanism, the triggering electrodes 1482—1483 of the third order selection tube 210 are connected in series with the primary of a transformer 1484 through a battery 1485, and the secondary of this transformer 1484 is connected through a switch 1489 in parallel with the initial triggering circuit, including the key 1461 and the battery 1460. In this way, the triggering pulse from the third order selection tube 210 will be carried back to the first order selection tube 10 to start another cycle of operation of the apparatus and repetition of this cycle of operation is continuous until the switch 1489 is opened.

The circuit shown in FIGURE 8 for automatic successive cyclic triggering of the apparatus is especially useful with the type of circuit shown in FIGURE 6 wherein the selection tubes 10, 110 and 210 are permanently connetced to the three lowest orders of the register mechanism comprising the tubes 601, 701 and 801, respectively, so that multiplying and dividing operations of any size can be performed in a rapid fashion by appropriate adjustment of the reversing controls, i.e., the reversing switches 99, 199 and 299, and by maintaining the contact 1489 enclosed until the desired number of operations have been performed.

In multiplication the desired number of operations will be indicated when the revolutions counter has registered a number of cycles of operation corresponding to the multiplier. In division the correct quotient will be obtained when the successive substraction of the divisor from the dividend has reduced the value standing in the register tubes to an amount less than the amount of the divisor.

*Modified Circuit Shown in FIGURE 9*

In FIGURE 9 is shown a cathode ray beam device employing magnetic beam deflection and beam conductivity which features may be employed in both the selection tubes 10, 110 and 210 and the register tubes 601, 701, 801, 901, 1001 and 1101. This arrangement employs a cathode ray tube 10a having an electron gun 10b for projecting a cathode ray beam consisting of an elongated concentration of electrons 10c in the direction of the electrodes 10d. Alternate ones of these electrodes 10d are connected to the voltage divider resistor 10e. Interleaved between the electrodes connected to the resistor 10e are electrodes connected to the switches 10f having one of the terminals thereof connected to a common bus bar 10g. This bus bar 10g is connected to the positive terminal of the battery 10h, and the negative terminal of this battery is connected to the quenching electrode 10i which is positioned in alignment with the electron gun 10b so that the electron beam normally passes through the aperture thereof. The top terminal of the voltage dividing resistor 10e is connected to the solenoid 10j employed for deflecting the beam 10c of the cathode ray tube and the other terminal of this solenoid is connected to the positive terminal of the battery 10k, the negative terminal of this battery being connected to the positive terminal of the electron gun battery 10m and the negative terminal of the latter battery is connected to the cathode of the electron gun.

The operation of this tube is substantially the same as the selection tubes and the register tubes except that in this case the cathode ray beam 10c is used as a conductor substantially throughout the length thereof so that as this beam 10c impinges upon the electrodes 10d it closes the circuit of the deflector solenoid 10j. Beginning at the bottom electrode of the group 10d and assuming the beam 10c contacts this bottom electrode, current will flow along the beam to this bottom electrode thence through the entire resistor 10e and then through the solenoid 10j through the batteries 10k and 10m to the cathode of the electron gun 10b. When the tube 10a is used as a selection tube, such as, one of the tubes 10, 110 and 210, this current flow sets up a magnetic field in the solenoid 10j of such strength and polarity as to move the beam 10c up from the first of the electrodes 10d across the second and to the third so that then the current flows from the beam to this third electrode and through the appropriate tap of the resistor 10e, through this resistor and through the solenoid 10j and batteries 10k and 10m to the cathode of the electron gun 10b. Since the portion of the resistor 10e between the first and third electrodes of the group 10d is by-passed out of the circuit, the current flowing through the solenoid 10j is of increased strength so that the magnetic field set up by this solenoid is stronger, specifically of such strength as to move the beam 10c from the third electrode to the fifth electrode of the group 10d, thereby by-passing still another section of the resistor 10e out of circuit and again increasing the strength of the magnetic field of the solenoid 10j sufficiently to raise the beam to the seventh electrode of the group 10d and repeating this operation in step by step fashion increasing the magnetic field of the solenoid 10j until the beam 10c has reached the second to the top electrode of the group 10d. Thereafter, the beam 10c would be swept off of the second to the top electrode and the circuit of the solenoid 10j would be interrupted. However, in tracing the operation as above, no cognizance was taken of the switches 10f which are provided to this apparatus for the purpose of controlling the scanning operation of the beam. If it is assumed that the first switch of the group 10f were closed so that the second electrode of the group 10d were connected through this switch to the positive terminal of the battery 10h, then when the beam 10c is moved by the solenoid 10j upward from the first electrode of the group 10d it would contact the second of these electrodes and apply an electric potential to the quenching electrode 10i and this quenching potential would function to effectively interrupt the beam 10c. Since the electrode 10i functions principally to apply an electrostatic field to disturb the focusing of the beam 10c, this electrode 10i may be enclosed in a sheath 10n of insulating material, such as, "Bakelite," phenol condensation resin, or the like, or a sheath of material which is a very poor conductor, such as, "Bakelite" impregnated with graphite, and this electrode may be supported upon the mouth of the electron gun 10b. It is, of course, obvious that the electron beam 10c will be shifted in step by step fashion up over the electrodes 10d until it impinges upon an electrode connected to one of the switches 10f that is closed. When the beam 10c contacts an electrode connected to a closed switch of the group 10f, the beam is quenched, as outlined above. In this way when the tube 10a is employed as a selection tube it may be used to produce a selected number of pulses, depending upon which of the switches 10f is closed, and the desired number of pulses may be utilized, as previously described in connection with tubes 10, 110 and 210 through suitable amplifier circuits. When the tube 10a is employed as a register tube, for example, of the type 601, 701, etc., the solenoid 10j is employed as a beam holding solenoid and the beam 10c is moved by pulses applied therethrough from switching tubes of the type 301, 351, etc. Inasmuch as in the case of tube 601 the beam shifting pulses are applied to the beam through a pair of deflector plates 607 and 608 which are not employed in the tube 10a, the beam shifting pulses in the case of tube 10a are applied to the tube 10a through an auxiliary solenoid similar to the solenoid 10j connected to the terminals 604 and 605. In other words, pulses fed to the terminals 604 and 605 from the switching tubes 301 and 351 may be applied to an auxiliary solenoid similar to solenoid 10j associated with the cathode ray tube 10a and the solenoid 10j may be employed as a beam holding solenoid. On the other hand, pulse inserting resistors, such as, resistor 602, may be connected in series with the beam holding solenoid 10j and beam shifting pulses fed into the circuit of this solenoid the same as with electrostatic deflection of tube 601.

While the circuits of tubes 601, 701, 801, 901 and 1001 have been shown as using pulse inserting resistors 602, 702, 802, 902 and 1002, it is of course apparent that these pulse inserting resistors may be dispensed with and the pulses applied to the beams of these tubes by means of solenoids and these solenoids may of course be connected to the terminals 604—605, 704—705, 804—805, etc. In this case, the pulses may be applied to these tubes by means of electromagnetic devices, such as solenoids, and the beams of these tubes may be held electrostatically by means of plates 607—608, 707—708, 807—808, etc. Thus, it is seen that the cathode ray tubes may employ both electromagnetic and electrostatic means for both shifting and holding the beams thereof or vice versa in the same tube, or both of these operations may be done either electromagnetically or electrostatically.

The electron guns and deflector plates of the various cathode ray devices described in this specification may be designed in accordance with the data set forth in the book entitled "Television, the Electronics of Image Transmission," by Zworykin and Morton, published by John Wiley & Sons in 1940.

*Mechanical Features*

Referring to FIGURE 10, a diagrammatic view of an apparatus embodying the instant invention, including a casing 1201 which houses the entire apparatus. In the casing 1201 are three windows 1202, 1203, and 1204 for displaying the numbers standing in the accumulator, the revolutions counter, and the keyboard, respectively. Associated with the opening 1202 in alignment therewith is a manually operable key 1205 for operating the zero setting switches 643, 743, 843, etc., while the key 1206 correspondingly operates the zero setting switches for the register tubes of the revolutions counter. At the window 1204 there may be displayed the numbers introduced through the keyboard comprising the ordinal rows of keys 36 through 44, inclusive, 136 through 144, inclusive, etc. Adjacent the ordinal rows of value keys above referred to are respective plus bar 1207 and minus bar 1208, which can be operated to cause positive and negative registrations, respectively, while the bar 1209 controls either positive or negative registration in the revolutions counter.

Figures 12, 13:
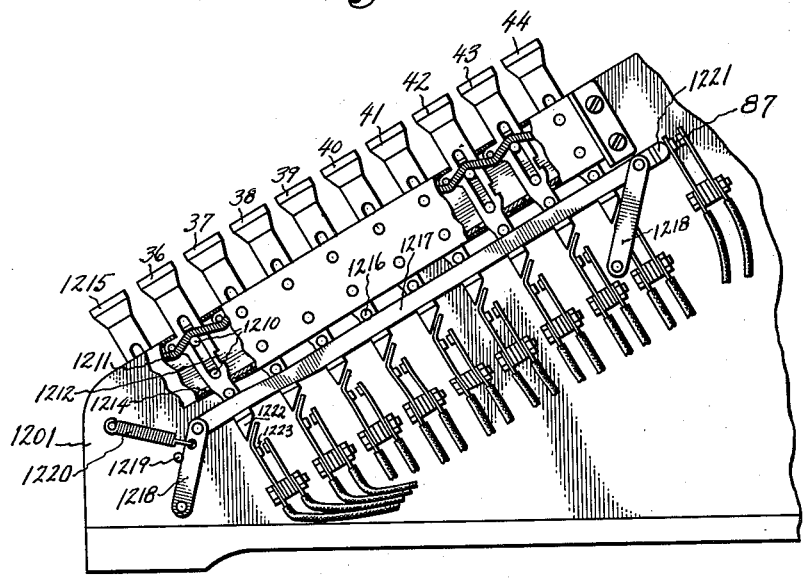
FIGURE 12 is an elevational view, partly in section, of a portion of the keyboard of the apparatus.
FIGURE 13 is a diagram of the arrangement of the composite parts, FIGURES 1A to 1I, inclusive, of FIGURE 1.

While the details of the mechanical portions of the device may be of any suitable character, FIGURE 12 illustrates an arrangement which can be employed with each ordinal row of keys, such as 36 to 44, wherein each key is shown mounted for vertical sliding movement on a pair of transverse rods 1210 and are held in engagement with the top plate of the casing 1201 by a coil spring 1211. Each key is provided with a latching tooth 1212 for cooperation with a latching slide 1214 of conventional construction. The latching slide 1214 may also be operated by a "zero" or release key 1215.

As previously explained, depression of each value key is adapted to enable the corresponding selection circuit by closing of the associated switch 87, 187, etc. For this purpose each key is provided with a pin 1216 immediately above a longitudinal bar 1217 of a parallel motion linkage including similar pivotally mounted supporting arms 1218, the left-hand one of which is urged against a stop pin 1219 by the spring 1220. At its right end, as viewed in FIGURE 12, the link 1217 is provided with an insulating button 1221 adjacent the normally open contacts 87 so that depression of any value key of the ordinal row serves to close the associated contacts 87 and enable the corresponding circuit. Also, each key, for example, key 36, is provided with an insulating end portion 1222 at its lower end for engagement with one of the spring contacts 1223 corresponding to the key contact 36 shown in FIGURE 1A.

Figure 11:
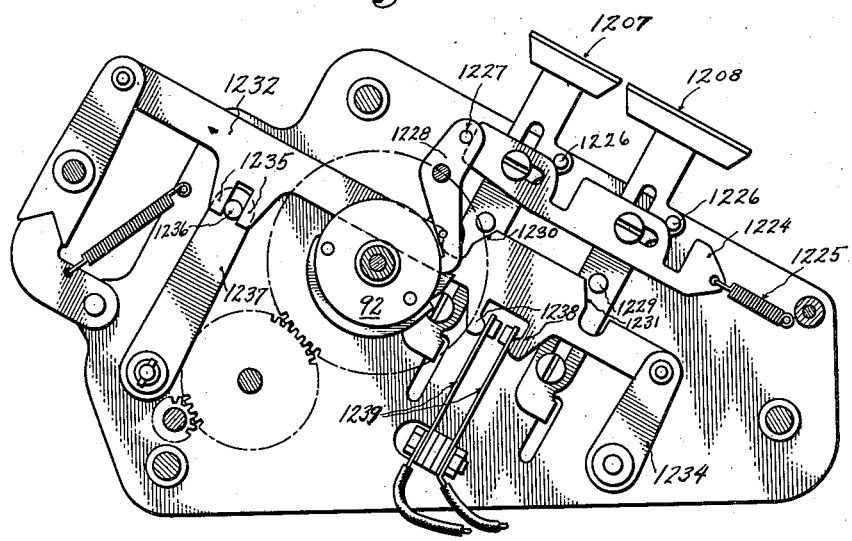
FIGURE 11 is a sectional elevational view of a portion of the control mechanism taken as indicated by the line 11—11 in FIGURE 10.

The mounting and construction of the plus and minus bars 1207 and 1208 may be of any desired conventional type and one suitable form is shown in FIGURE 11. The keys 1207 and 1208 are mounted for vertical sliding movement on a suitable mounting plate, and have associated therewith a slide 1224 spring-urged to position shown by a spring 1225 and operable by either of the pins 1226 on the respective keys. At one end the slide 1224 abuts a pin 1227 on a clutch control lever 1228 associated with the clutch 92, which is of conventional construction and may be of the type disclosed in the U.S. patent to Carl M. Friden, No. 2,311,354. Each of the keys 1207 and 1208 also carry pins 1229 associated with the oppositely inclined cam surfaces 1230 and 1231 of a slide 1232 mounted on parallel pivoted links 1234. The slide 1232 has spaced ears 1235 which engage a pin 1236 on a control arm 1237 connected in any convenient manner to the reversing switches 99, 199, etc. and 748, 848, etc. to control positioning thereof upon depression of the keys 1207 and 1208. The slide 1232 also has ears 1238 disposed at opposite sides of a pair of spring contacts 1239 which close the circuit for the motor 93 upon movement of the slide 1232 in either direction.

While the preferred forms of this invention have been set forth in the foregoing specification, it is not desired to limit this invention to the exact details described except in so far as those details may be defined by the claims.

What is claimed is:

1. In a calculating apparatus the combination of an electronic pulse producing device comprising a circuit including a first set of electrodes for producing pulses representing values from one to nine and a set of control electrodes comprising electrodes disposed between selected ones of said first set of electrodes, manually settable means connected to said control electrodes for selectively rendering said control electrodes effective and thereby determining the number of pulses produced, and electronic register apparatus connected to said electronic pulse producing device, said electronic register apparatus comprising a plurality of cathode ray beam devices each having deflector means connected to said electronic pulse producing device, and means for exhibiting numbers having a predetermined relation to the number of pulses generated by said pulse generating apparatus.

2. In a register, selection mechanism including a pulse producing cathode ray tube having a series of electrodes in linear array, means for producing a beam for sweeping across said electrodes in linear fashion, and means for controlling the number of electrodes swept by said beam to provide a selective number of electrical pulses from 1 to 9, and a pulse responsive cathode ray tube for registering values in response to the number of pulses received from said pulse producing tube, said pulse responsive tube including a series of beam responsive contacts arranged in linear fashion and connections for connecting the beam deflector electrodes of said pulse responsive cathode ray tube to receive pulses from said pulse producing cathode ray tube to effect step by step sweeping of the beam of said pulse responsive tube across said contacts in response to the number of pulses received by said pulse responsive tube.

3. In a register, selection mechanism including a pulse producing cathode ray tube having a series of electrodes in linear array, means for producing a beam for sweeping across said electrodes in linear fashion, and means for controlling the number of electrodes swept by said beam to provide a selective number of electrical pulses from 1 to 9, and a pulse responsive cathode ray tube for registering values in response to the number of pulses received from said pulse producing tube, said pulse responsive tube including a series of beam responsive contacts arranged in linear fashion and means for effecting step by step sweeping of the beam of said tube across said contacts in response to the number of pulses received by said pulse responsive tube.

4. In a calculating apparatus the combination of an electronic pulse producing device, manually settable means connected to said pulse producing device to control the number of pulses produced thereby to represent a digit value, a pulse utilizing circuit connected to said pulse producing device, said pulse utilizing circuit comprising an electronic register apparatus connected to said pulse producing device, said electronic register apparatus comprising a plurality of cathode ray beam accumulating devices each having a plurality of sets of beam deflector means with one set of beam deflector means of each device connected to said electronic pulse producing device, tens transfer circuits connected between adjacent orders of said accumulating devices of said electronic register and connections for connecting the other set of said beam deflector means to deflect the cathode ray beam of the corresponding accumulating device in accordance with the number of tens transfer pulses received from the next lower order accumulating device, and means for exhibiting numbers having a predetermined relation to the position of said cathode ray beam.

5. In a calculating apparatus the combination of a cathode ray tube pulse producing device, a potentiometer, a first series of electrodes associated with said cathode ray tube and connected to sequential portions of said potentiometer, a set of controlling electrodes comprising electrodes disposed between alternate ones of said first series of electrodes, a beam quenching electrode within said cathode ray tube, and manually settable means for connecting a selected one of said controlling electrodes to said beam quenching electrode and a pulse utilizing circuit connected to said cathode ray tube.

6. In combination a pulse producing tube, said pulse producing tube having means connected thereto for producing from one to nine pulses in a cycle of operation, electronic switching means connected to the output of said pulse producing tube, electronic register means connected to said electronic switching means for receiving pulses from said pulse producing tube, said register means having a plurality of orders, each of said orders having an electron tube, and each of said electron tubes having means for registering from one to nine pulses received from said pulse producing tube.

7. In combination a pulse producing tube, said pulse producing tube having means connected thereto for producing from one to nine pulses in a cycle of operation, switching means connected to the outputs of said pulse producing tube, electronic register means connected to said electronic switching means for receiving pulses from said pulse producing tube, said register means having a plurality of orders, each of said orders having an electron tube, and each of said electron tubes having means therein for registering successive groups of one to nine pulses each received from said pulse producing tube to indicate the sum of such successive groups.

8. In a register, a plurality of ordinarily arranged electric discharge tubes for providing value indications, representing a plural digit value, each of said tubes having means connected thereto for producing from 1 to 9 pulses in a cycle of operation, a plurality of ordinally arranged electric discharge tubes for selectively receiving value indications of a plural digit value from said first-named discharge tubes, each of said last mentioned tubes having means therein for registering successive groups of 1 to 9 pulses to indicate the sum of the value indications, and electrical switching means between said first-named tubes and said last-named tubes for choosing an ordinal group of said second plurality of tubes to receive indications representing said plural digit value from said first plurality of tubes.

9. In a register the combination of a multiple order selection device having an output circuit for each order thereof, a plurality of electron discharge devices, each of said orders of said selection device comprising one of said electron discharge devices and each of said electron discharge devices having a plurality of electron intercepting electrodes, connections for connecting the electron intercepting electrodes of each of said electron discharge devices to a separate one of said output circuits, a plurality of switching electron discharge devices, connections for connecting selected ones of said switching electron discharge devices connected to different ones of said output circuits, each of said switching electron discharge devices having a plurality of target electrodes, a multiple order register, a plurality of accumulator electron discharge devices, each of said orders of said register comprising one of said accumulator electron discharge devices, and connections for connecting different target electrodes of each of said switching electron discharge devices to different ones of said accumulator electron discharge devices for the transmission of signals representing values thereto.

10. In a register the combination of a multiple order selection device having an output circuit for each order thereof, a plurality of electron discharge devices for generating electrical pulses, each of said orders of said selection device comprising one of said electron discharge devices and each of said electron discharge devices having a plurality of electron intercepting electrodes, connections for connecting the electron intercepting electrodes of each of said electron discharge devices to a separate one of said output circuits, a plurality of switching electron discharge devices, connections for connecting selected ones of said switching electron discharge devices connected to different ones of said output circuits for receiving the electrical pulses therefrom, each of said switching electron discharge devices having a plurality of target electrodes, a multiple order register, a plurality of accumulator electron discharge devices, each of said orders of said register comprising one of said accumulator electron discharge devices, and connections for connecting different target electrodes of each of said switching electron discharge devices to different ones of said accumulator electron discharge devices so that the values represented by the electrical pulses generated in the different orders of said selection device are transmitted to predetermined orders of said register.

11. In a register the combination of a multiple order selection device having an output circuit for each order thereof, a plurality of electron discharge devices, each of said orders of said selection device comprising one of said electron discharge devices and each of said electron discharge devices having a plurality of electron intercepting electrodes, means in each of said electron discharge devices for sweeping said electrodes with a stream of electrons, means for selecting the number of said electrodes to be swept by said stream of electrons to generate predetermined numbers of pulses in each of said orders, connections for connecting the electron intercepting electrodes of each of said electron discharge devices to a separate one of said output circuits, a plurality of switching electron discharge devices, connections for connecting selected ones of said switching electron discharge devices connected to different ones of said output circuits, each of said switching electron discharge devices having a plurality of target electrodes, a multiple order register, a plurality of accumulator electron discharge devices, each of said orders of said register comprising one of said accumulator electron discharge devices, and connections for connecting different target electrodes of each of said switching electron discharge devices to different ones of said accumulator electron discharge devices so that the electrical pulses from different ones of said output circuits are transmitted to predetermined orders of said register.

12. A register as set forth in claim 11 further comprising additional electron discharge devices connected between adjacent orders of said accumulator electron discharge devices for transmitting a pulse corresponding to every tenth pulse received by the lower order accumulator device to the next higher order accumulator device.

13. In a calculating machine the combination of an electronic pulse producing tube, operation controlling means for accurately controlling the number of pulses produced by said pulse producing tube in each cycle of operation, means for controlling the number of cycles of operation of said pulse producing tube, a plurality of registers, each of said registers representing a different mathematical order, electronic switching means connected between the output of said pulse producing tube and said registers for selectively feeding pulses from said pulse producing tube to said registers, said electronic switching means comprising a tube with a plurality of electron emissive electrodes, connections for connecting different ones of said electron emissive electrodes respectively to different orders of said registers, and an electric circuit connected to said electronic switching means for causing different ones of said electron emitting electrodes to be electron emissive for selecting the register order to which said pulses are fed.

14. In a calculating machine the combination of an electronic pulse producing tube, a plurality of registers, each of said registers representing a different mathematical order, electronic switching means connected between the output of said pulse producing tube and said registers for selectively feeding pulses from said pulse producing tube to said registers, said electronic switching means comprising a tube with a plurality of electron emissive electrodes, connections for connecting different ones of said electron emissive electrodes respectively to different orders of said registers, and an electric circuit connected to said electronic switching means for causing different ones of said electron emitting electrodes to be electron emissive for selecting the register order to which said pulses are fed.

15. In combination a pulse producing tube, said pulse producing tube having means connected thereto for producing from one to nine pulses in a cycle of operation, electronic switching means connected to the output of said pulse producing tube, an electronic register connected to said electronic switching means for receiving pulses from said pulse producing tube, sadi register having a plurality of orders, each of said orders having an electron tube, and each of said electron tubes having means for registering from one to nine pulses received from said pulses producing tube, said electronic switching means comprising a tube with a plurality of electron emissive electrodes, connections for connecting different ones of said electron emissive electrodes respectively to different ones of said register orders, and means for causing different ones of said electron emitting electrodes to be electron emissive for selecting the register order to which said pulses are fed.

16. In combination a pulse producing tube, said pulse producing tube having means connected thereto for producing from one to nine pulses in a cycle of operation, electronic switching means connected to the outputs of said pulse producing tube, electronic register means connected to said electronic switching means for receiving pulses from said pulse producing tube, said register means having a plurality of orders, each of said orders having an electron tube, and each of said electron tubes having means therein for registering successive groups of one to nine pulses each received from said pulse producing tube to indicate the sum of such successive groups, said electronic switching means comprising a tube with a plurality of electron emissive electrodes, and means for connecting different ones of said electron emissive electrodes to different orders of said register means.

17. Switching apparatus responsive to a control voltage for conveying an electrical signal comprising first and second electron relay tubes each including a cathode to generate a primary electron beam, a beam deflecting element and two spaced collecting electrodes one of which acts as an auxiliary cathode emissive of a secondary electron stream when impinged on by said primary beam, the other electrode acting as an anode for said secondary electrons, the secondary electron stream defining a switching path between the auxiliary cathode and the anode, means for connecting the auxiliary cathode of said first tube to the anode of said second tube whereby the switching paths of said tubes are serially connected, and means to apply a control voltage to the deflecting elements of both of said tubes to deflect the beams therein onto the auxiliary cathodes thereof.

18. In a calculating device of the type employing thermionic tubes the improvement consisting of a tube responsive to electrical signals comprising a target for electrons, said target including two sets of opposed electrodes that are electrically insulated from each other, coatings of electron emissive material on respectively opposite surfaces of said two sets of electrodes, means for applying a voltage between said coatings, and means for subjecting said target to a beam of electrons for producing electron emission from either one of said opposed electrodes so that the space therebetween is rendered conductive irrespective of the polarity of said opposed electrodes.

19. In a calculating apparatus the combination of a pulse producing cathode ray tube comprising a first set of electrodes for producing pulses representing the values 1 to 9 and a second set of control electrodes positioned to be swept by the beam simultaneously with said first set of electrodes, and means connected to said control electrodes for rendering any selected said control electrode effective to interrupt sweeping of said beam and thereby determine the number of pulses produced, and an electronic registering apparatus connected to said pulse producing tube, said electronic registering apparatus comprising a plurality of cathode ray beam devices each having deflector means connected to said pulse producing cathode ray tube, and means for exhibiting numbers having a predetermined relation to the number of pulses generated by said pulse generating apparatus.

20. In a calculating apparatus the combination of a pulse producing cathode ray tube comprising a first set of electrodes for producing pulses representing the values 1 to 9 and a second set of control electrodes positioned to be swept by the beam simultaneously with said first set of electrodes, and means connected to said control electrodes for rendering any selected said control electrode effective to interrupt sweeping of said beam and thereby determine the number of pulses produced, and an electronic registering apparatus connected to said pulse producing tube, said electronic registering apparatus comprising a plurality of cathode ray beam devices each having deflector means connected to said pulse producing cathode ray tube.

21. In a register, a registering circuit including a first order and a second order cathode ray tube each having means for producing an electron beam, each said tube having main deflecting electrodes for deflecting the beam thereof in incremental linear fashion to register a value, and means in said circuit responsive to a signal of positive polarity to effect addition to the value standing in the registering circuit by effecting incremental linear deflection of the electron beams in each of said tubes in one direction, and responsive to a signal of negative polarity to effect subtraction of the value from the value standing in the registering circuit by effecting incremental linear deflection of said beam in each of said tubes in the opposite direction, auxiliary beam deflecting electrodes in said second order tube, and a tens transfer tube having an output circuit connected to said auxiliary beam deflecting electrodes and having an input circuit connected to said first order tube.

22. In a register, a registering circuit including a first order and a second order cathode ray tube each having means for producing an electron beam, each said tube having main deflecting electrodes for deflecting the beam thereof to register a value, and means in said circuit responsive to a signal of positive polarity to effect addition to the value standing in the registering circuit by effecting deflection of the electron beams in each of said tubes in one direction, and responsive to a signal of negative polarity to effect subtraction of the value from the value standing in the registering circuit by effecting deflection of said beam in each of said tubes in the opposite direction, auxiliary beam deflecting electrodes in said second order tube, and a tens transfer tube having an output circuit connected to said auxiliary beam deflecting electrodes and having an input circuit connected to said first order tube.

23. In a register, a registering circuit including a pair of cathode ray tubes, each having a plurality of electrode positions corresponding to digits 0 to 9, each also having main deflecting electrodes for moving said beam over said electrode positions, transfer electrode means interposed between said 9 position and said 0 position in the lower order of said tubes, auxiliary beam deflecting electrodes in the higher order of said tubes, a tens transfer circuit between said tubes including an electronic discharge device having its output connected to the auxiliary deflecting electrodes of the tube of higher order, and connections for connecting the input of said transfer circuit to said transfer electrode means of the lower order, said tens transfer circuit being operative upon impingement of the cathode ray beam of said lower order of cathode ray tube upon said transfer electrode means for causing operation of said electronic discharge tube to cause entry of a transfer increment in the higher order of said tubes.

24. In a register, a registering circuit including a pair of cathode ray tubes, each having a plurality of electrode positions corresponding to digits 0 to 9, each also having main deflecting electrodes for moving said beam over said electrode positions, a transfer electrode in the lower order of said tubes, auxiliary beam deflecting electrodes in the higher order of said tubes, a tens transfer circuit between said tubes having its output connected to the auxiliary deflecting electrodes of the tube of higher order, and connections for connecting the input of said transfer circuit to said transfer electrode means of the lower order, said tens transfer circuit being operative upon impingement of the cathode ray beam of said lower order of cathode ray tube upon said transfer electrode means for causing operation of said tens transfer circuit to cause entry of a transfer increment in the higher order of said tubes.

25. Electronic apparatus of the character described, including: a plurality of cathode ray devices each having a plurality of operative target areas; a cathode ray device having a control function; means for moving the ray beam in the control device in steps to a desired location; and electronic apparatus actuated by and in accordance with the position of the ray beam in the control device and connected to said first mentioned cathode ray devices for precisely positioning the ray beam in each of the operative devices, the connection between this last mentioned apparatus and the operative devices having transmission line characteristics.

26. A memory device comprising information storage means comprising a charge retaining surface, means for storing information on said storage means, and means for directing said storing means to a particular storage position comprising an electron discharge device having a source of electrons and an electrode, and means for directing electrons from said source to a position on said electrode corresponding to said particular storage position, said electron directing means being functionally related to said storing means directing means.

27. A memory device comprising information storage means comprising a charge retaining surface, means for storing information on said storage means, and means for directing said storing means to a particular storage position comprising an electron discharge device having a source of electrons and an electrode, means for forming said electrons into a sharply defined beam, means for directing said electron beam to various positions on said electrode, and means for controlling said electron beam and said means for directing said storing means in response to the output from said electrode.

28. The method of operating beam switching tubes comprising the steps of holding the beam in a fixed stable position in a static condition, sending the beam to a further semi-stable position in response to a dynamic input condition, holding the beam in the semi-stable position for the duration of the input condition, removing the beam to an unstable position upon cessation of the input condition, and thereby causing the beam to proceed automatically from the unstable position to a fixed stable position.

29. An electronic system comprising a multi-position beam switching tube having a beam forming structure, the tube having a plurality of beam receiving targets to accept the beam in any of its positions, the tube further having switching means to cause the beam to advance from one target position to another, means deriving a first gating potential from an electrode upon which the beam is impinging, an external source providing a second gating potential, and circuit means operating the switching means to cause the beam to switch from one target position to another only in response to both said gating potentials.

30. A signal storage system comprising a storage tube having means for providing a beam of electrons and a storage target assembly including an insulating storage member and a plurality of individually insulated conductive units, means for substantially linearly deflecting said beam across said storage member to write data thereon, and means associated with and responsive to operation of said deflection means for changing the potential of each of said conductive units from a known first potential level to a known second potential level to cyclically erase data stored on said storage target unit by unit.

31. An electronic system comprising a multi-position beam switching tube having beam forming structure, the tube having a plurality of beam receiving targets to accept the beam in any of its positions, the tube further having a set of switching means to cause the beam to advance from one target position to another, means deriving a first gating potential from a target electrode upon which the beam is infringing, means deriving a second gate potential from an external source, a separate gating circuit connected between each target and said switching means for causing the beam to switch from one target position to the next only in response to both gating potentials.

32. In a calculating machine, the combination of an electronic pulse producing tube, operation controlling means for accurately controlling the number of pulses representing numbers produced by said pulse producing tube in each cycle of operation, means for controlling the number of cycles of operation of said pulse producing tube, a plurality of registers, each of said registers representing a different mathematical order, electronic switching means connected between the output of said pulse producing tube and said registers for selectively feeding pulses from said pulse producing tube to said registers, an electric circuit connected to said electronic switching means for selecting the register order to which said pulses are fed, and pulse rate selecting means connected between said pulse producing device and said registers, said pulse rate selecting means being adjusted to select only predetermined pulse rates.

33. In a calculating machine, the combination of an electronic pulse producing tube, operation controlling means for accurately controlling the number of pulses representing numbers produced by said pulse producing tube in each cycle of operation, means for controlling the number of cycles of operation of said pulse producing tube, a plurality of registers, each of said registers representing a different mathematical order, electronic switching means connected between the output of said pulse producing tube and said registers for selectively feeding pulses from said pulse producing tube to said registers, an electric circuit connected to said electronic switching means for selecting the register order to which said pulses are fed, and pulse rate adjusting means connected to said pulse producing device for controlling the rate of pulse production by said pulse producing device.

References Cited in the file of this patent

UNITED STATES PATENTS

| | | |
|---|---|---|
| 2,097,392 | Finch | Oct. 26, 1937 |
| 2,165,308 | Skellett | July 11, 1939 |
| 2,172,859 | Toulon | Sept. 12, 1939 |
| 2,204,055 | Skellett | June 11, 1940 |
| 2,224,677 | Hanscom | Dec. 10, 1940 |
| 2,239,407 | Wagner | Apr. 22, 1941 |
| 2,251,984 | Cleaver | Aug. 12, 1941 |
| 2,265,216 | Wolf | Dec. 9, 1941 |
| 2,267,827 | Hubbard | Dec. 30, 1941 |
| 2,281,350 | Bryce | Apr. 28, 1942 |
| 2,283,383 | McNaney | May 19, 1942 |
| 2,297,443 | Von Ardenne | Sept. 29, 1942 |
| 2,299,252 | Pierce | Oct. 20, 1942 |
| 2,306,407 | Rosenthall | Dec. 29, 1942 |
| 2,337,980 | Du Mont | Dec. 28, 1943 |
| 2,361,766 | Hadekel | Oct. 31, 1944 |
| 2,373,134 | Massonneau | Apr. 10, 1945 |
| 2,401,621 | Desch et al. | June 4, 1946 |
| 2,401,729 | Goldsmith | June 11, 1946 |
| 2,402,372 | Compton | June 18, 1946 |
| 2,402,989 | Dickenson | July 2, 1946 |
| 2,403,852 | Desch | July 9, 1946 |
| 2,403,873 | Mumma | July 9, 1946 |
| 2,404,047 | Flory et al. | July 16, 1946 |
| 2,404,106 | Snyder | July 16, 1946 |
| 2,404,697 | Desch et al. | July 23, 1946 |
| 2,404,920 | Overbeck | July 30, 1946 |
| 2,415,190 | Rajchman | Feb. 4, 1947 |
| 2,416,793 | Compton | Mar. 4, 1947 |
| 2,417,450 | Sears | Mar. 18, 1947 |
| 2,435,841 | Morton | Feb. 10, 1948 |
| 2,436,677 | Snyder | Feb. 24, 1948 |
| 2,438,492 | Bascom | Mar. 30, 1948 |
| 2,441,296 | Snyder | May 11, 1948 |
| 2,442,428 | Mumma | June 1, 1948 |
| 2,446,945 | Morton | Aug. 10, 1948 |
| 2,451,859 | Mumma | Oct. 19, 1948 |
| 2,458,291 | Munster et al. | Jan. 4, 1949 |
| 2,477,008 | Rosen | July 26, 1949 |
| 2,498,081 | Joel et al. | Feb. 21, 1950 |
| 2,502,360 | Williams | Mar. 28, 1950 |
| 2,513,442 | Baker | July 4, 1950 |
| 2,517,712 | Riggen | Aug. 8, 1950 |
| 2,526,216 | Mulberger | Oct. 24, 1950 |
| 2,528,187 | Sziklai | Oct. 31, 1950 |
| 2,528,725 | Rines | Nov. 7, 1950 |
| 2,556,614 | Desch | June 12, 1951 |
| 2,597,360 | Moon | May 20, 1952 |
| 2,654,049 | Clark | Sept. 29, 1953 |

FOREIGN PATENTS

| | | |
|---|---|---|
| 857,806 | France | Oct. 1, 1940 |